United States Patent
Yamakawa

(10) Patent No.: US 6,842,295 B2
(45) Date of Patent: Jan. 11, 2005

(54) IMAGING LENS FORMED OF APERTURE DIAPHRAGM AND ONLY TWO LENS COMPONENTS

(75) Inventor: Hiromitsu Yamakawa, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 7 days.

(21) Appl. No.: 10/385,531

(22) Filed: Mar. 12, 2003

(65) Prior Publication Data

US 2003/0197956 A1 Oct. 23, 2003

(30) Foreign Application Priority Data

Mar. 29, 2002 (JP) ........................................ 2002-094265

(51) Int. Cl.[7] ............................ G02B 3/02; G02B 13/18
(52) U.S. Cl. ..................................... 359/708; 359/717
(58) Field of Search ................................ 359/708–717, 359/738–739

(56) References Cited

U.S. PATENT DOCUMENTS

| | | |
|---|---|---|
| 5,502,597 A | 3/1996 | Estelle et al. |
| 6,011,660 A | 1/2000 | Nagahara |
| 6,416,240 B1 | 7/2002 | Johnson |
| 6,441,971 B2 | 8/2002 | Ning |
| 6,724,532 B1 * | 4/2004 | Fu et al. ...................... 359/717 |

* cited by examiner

Primary Examiner—Georgia Epps
Assistant Examiner—Alicia M Harrington
(74) Attorney, Agent, or Firm—Arnold International; Jon W. Henry; Bruce Y. Arnold

(57) ABSTRACT

An imaging lens for an image pickup device is formed of only two lens components that are lens elements. An aperture diaphragm is on the object side of the object-side lens component. All four lens component lens surfaces are aspheric. The lens surface configuration near the optical axis of the object-side lens surface of the second lens component is convex. The lens surface configuration near the optical axis of at least one of the other three lens surfaces is concave. In various different embodiments, the lens surface configuration near the optical axis and the lens surface configuration near the periphery of a lens surface are different; the lens surface configuration of the intermediate portion of a lens surface differs from the other lens surface configurations; the Abbe numbers of the two lens elements satisfy a certain relationship; and a diffractive optical surface is used as one lens surface.

23 Claims, 13 Drawing Sheets

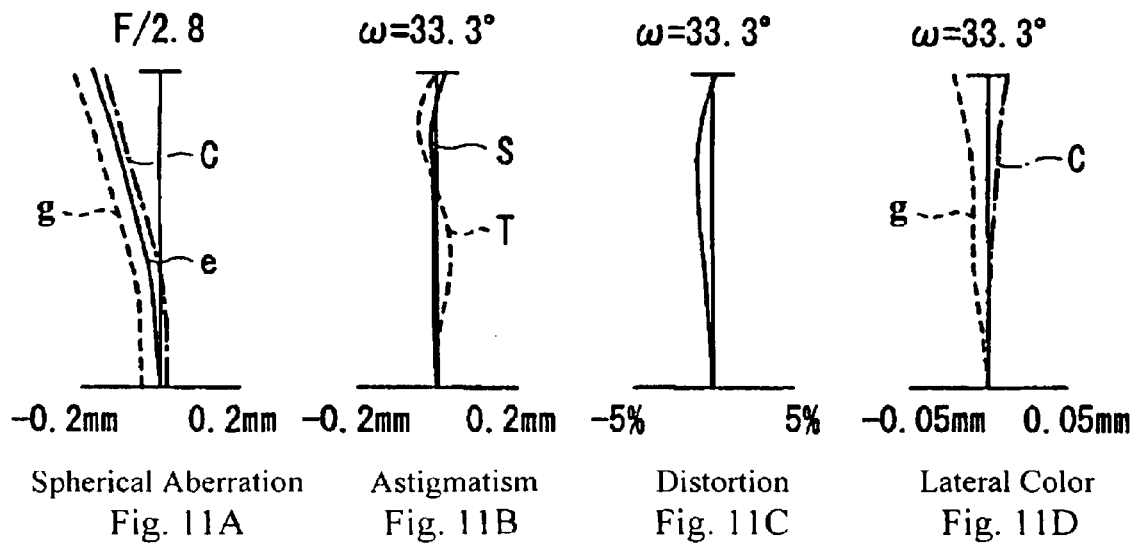
Spherical Aberration Fig. 11A | Astigmatism Fig. 11B | Distortion Fig. 11C | Lateral Color Fig. 11D
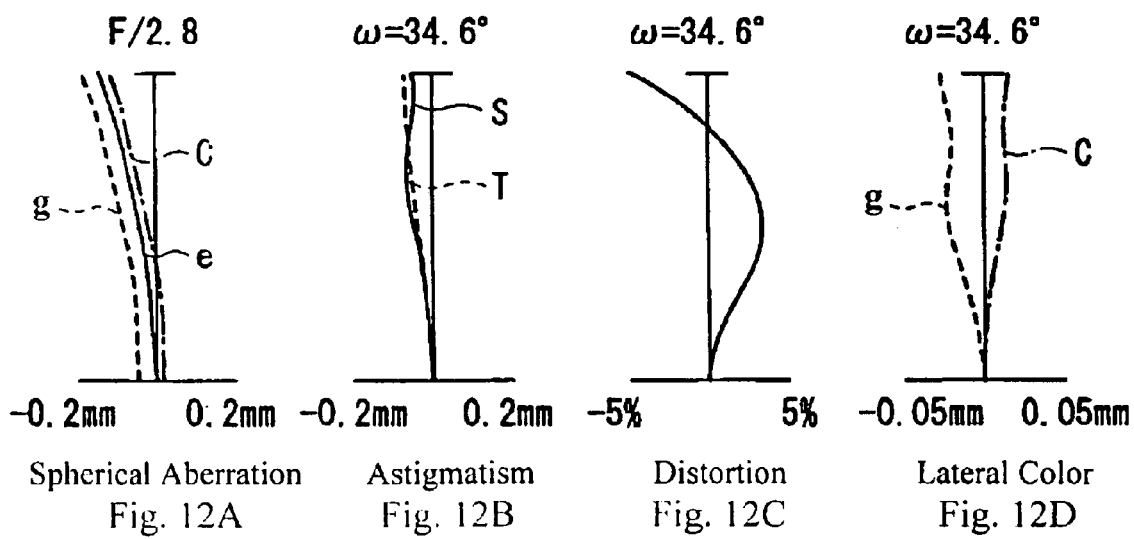
Spherical Aberration Fig. 12A | Astigmatism Fig. 12B | Distortion Fig. 12C | Lateral Color Fig. 12D

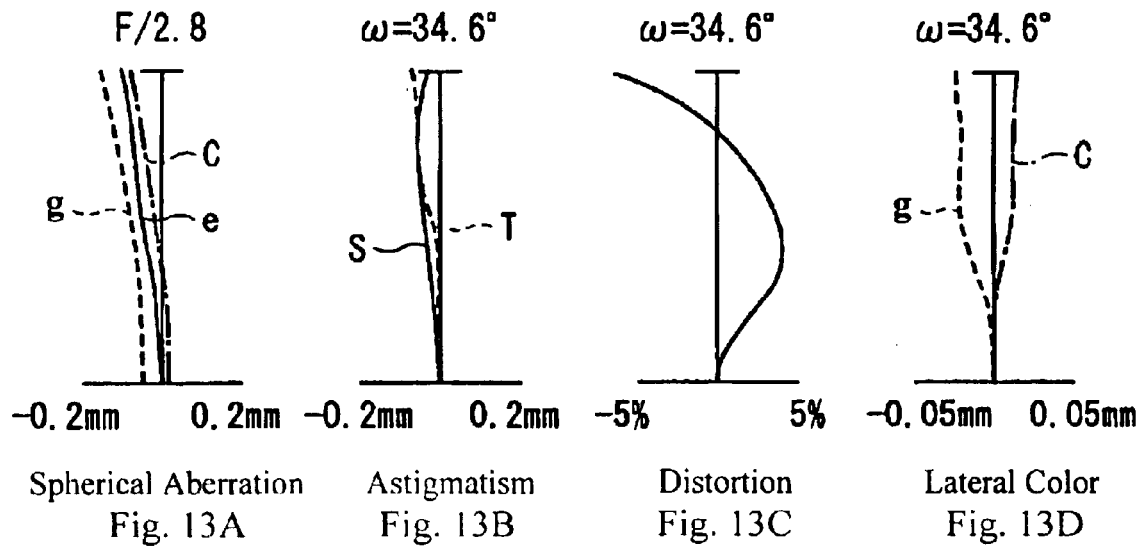
Spherical Aberration Fig. 13A  Astigmatism Fig. 13B  Distortion Fig. 13C  Lateral Color Fig. 13D
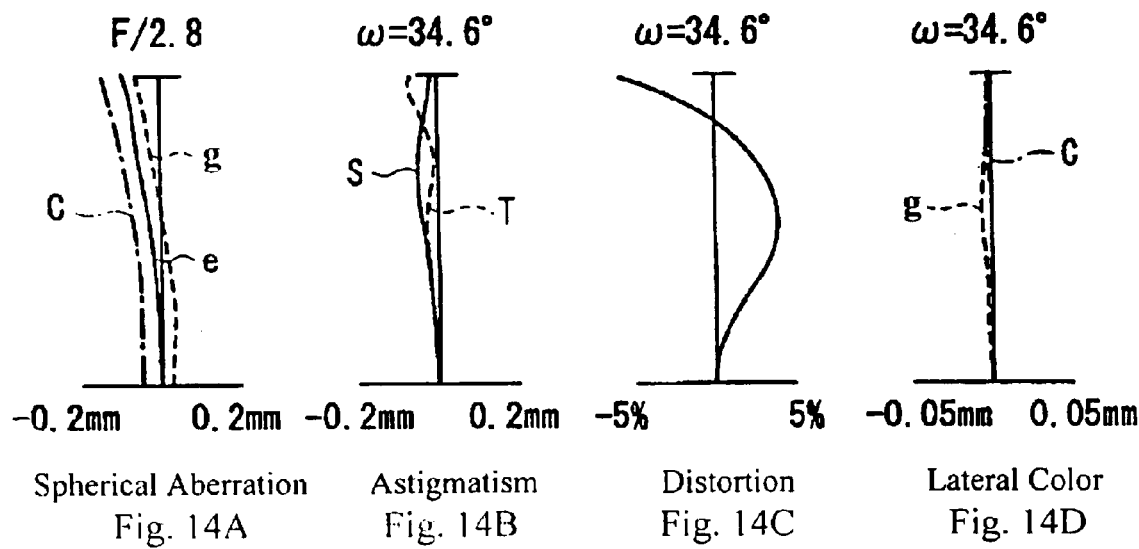
Spherical Aberration Fig. 14A  Astigmatism Fig. 14B  Distortion Fig. 14C  Lateral Color Fig. 14D

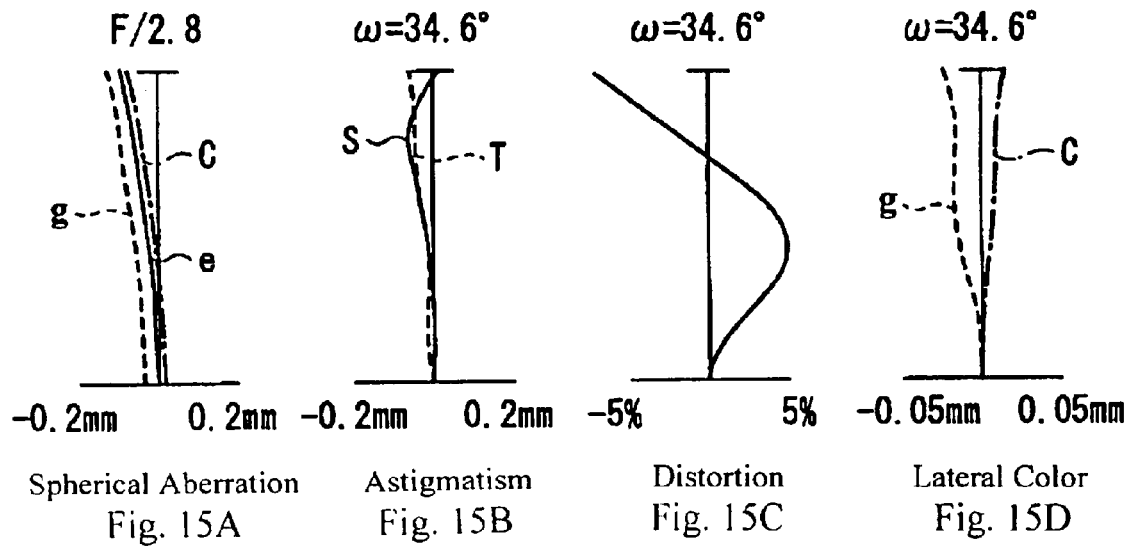
Spherical Aberration
Fig. 15A
Astigmatism
Fig. 15B
Distortion
Fig. 15C
Lateral Color
Fig. 15D
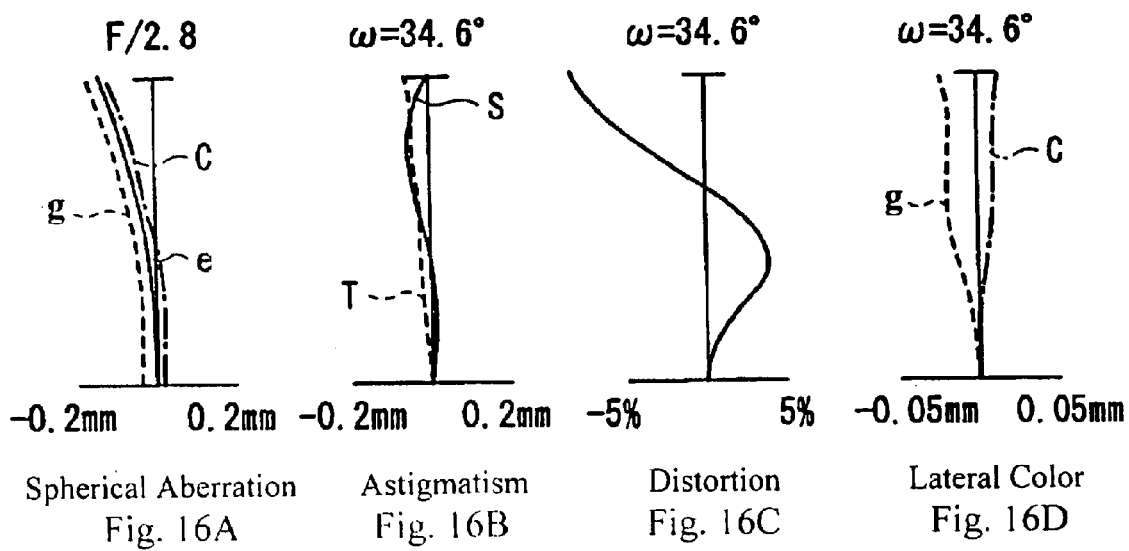
Spherical Aberration
Fig. 16A
Astigmatism
Fig. 16B
Distortion
Fig. 16C
Lateral Color
Fig. 16D

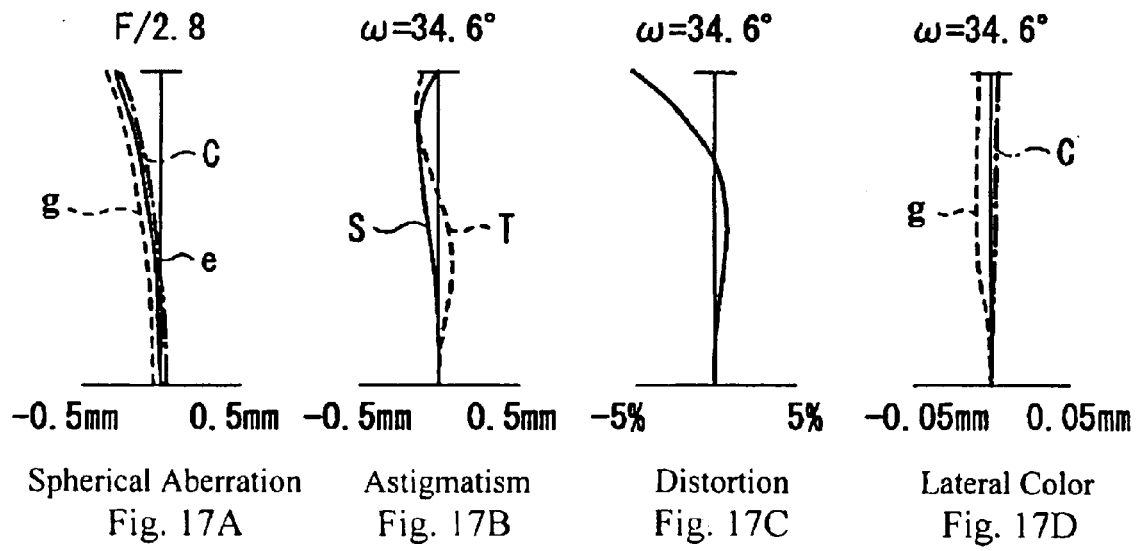
Spherical Aberration
Fig. 17A
Astigmatism
Fig. 17B
Distortion
Fig. 17C
Lateral Color
Fig. 17D
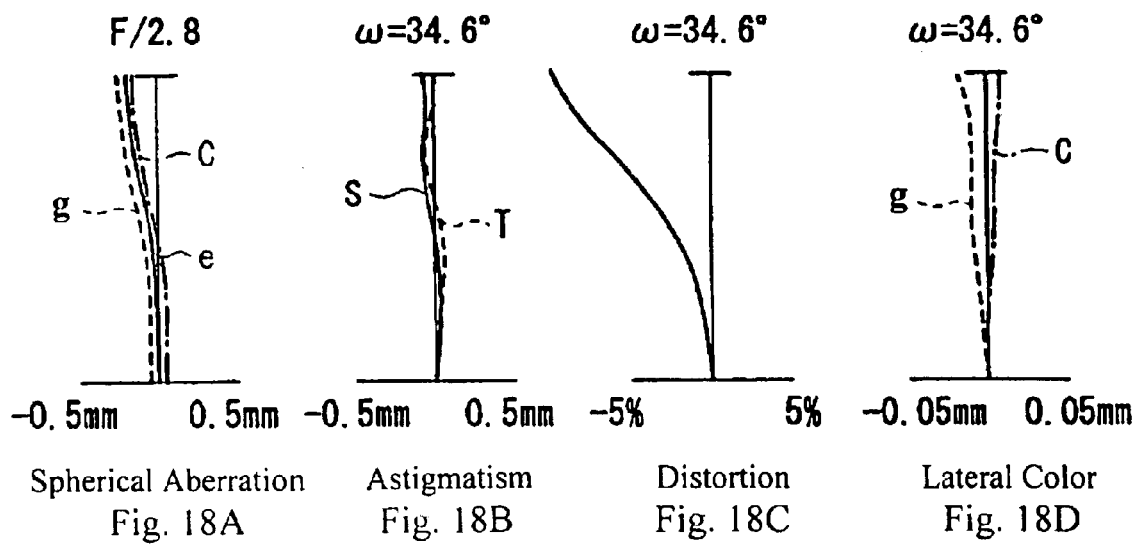
Spherical Aberration
Fig. 18A
Astigmatism
Fig. 18B
Distortion
Fig. 18C
Lateral Color
Fig. 18D

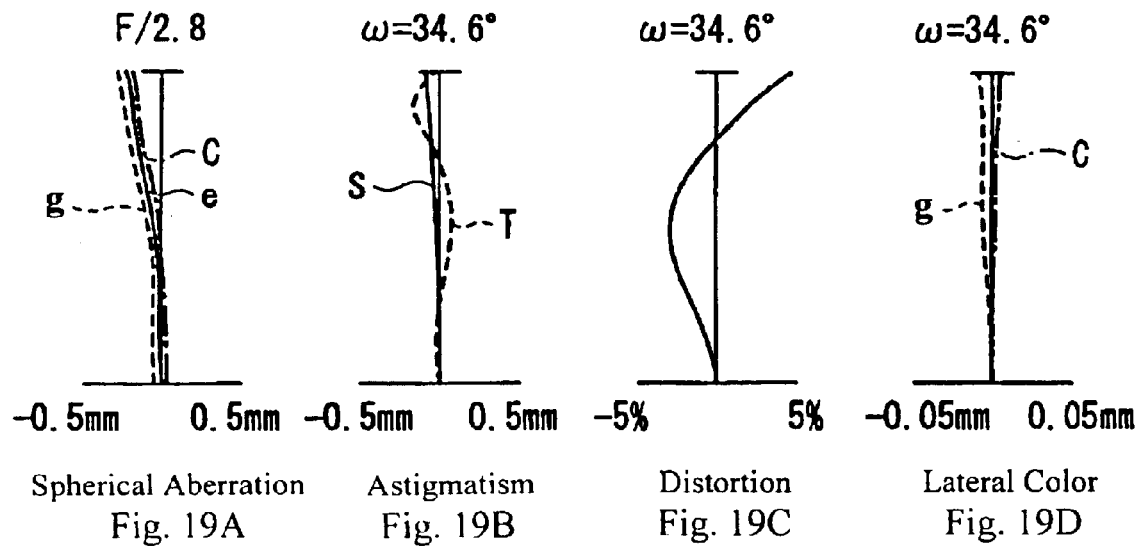
Spherical Aberration Fig. 19A | Astigmatism Fig. 19B | Distortion Fig. 19C | Lateral Color Fig. 19D
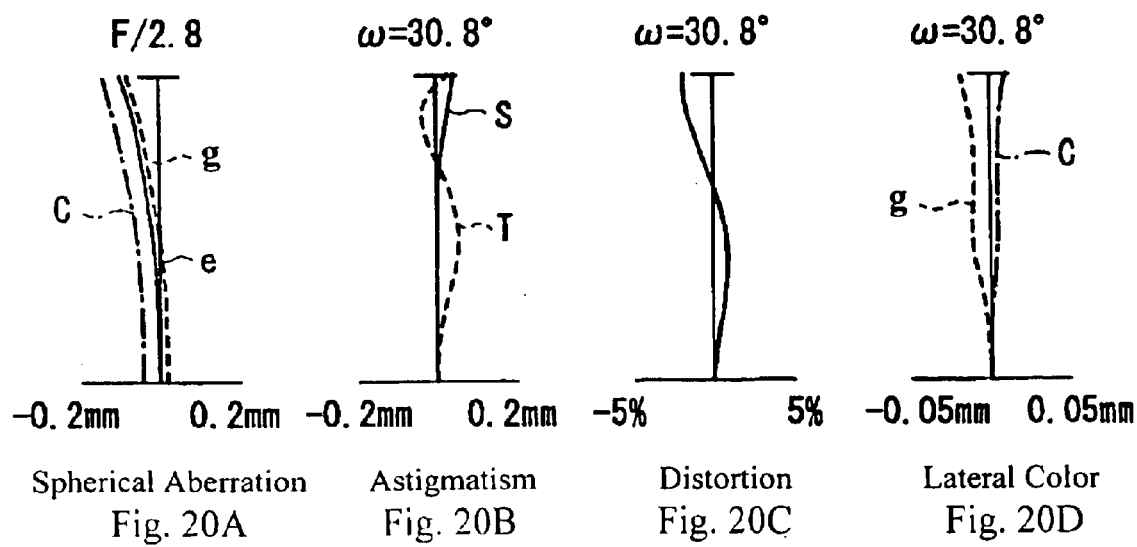
Spherical Aberration Fig. 20A | Astigmatism Fig. 20B | Distortion Fig. 20C | Lateral Color Fig. 20D

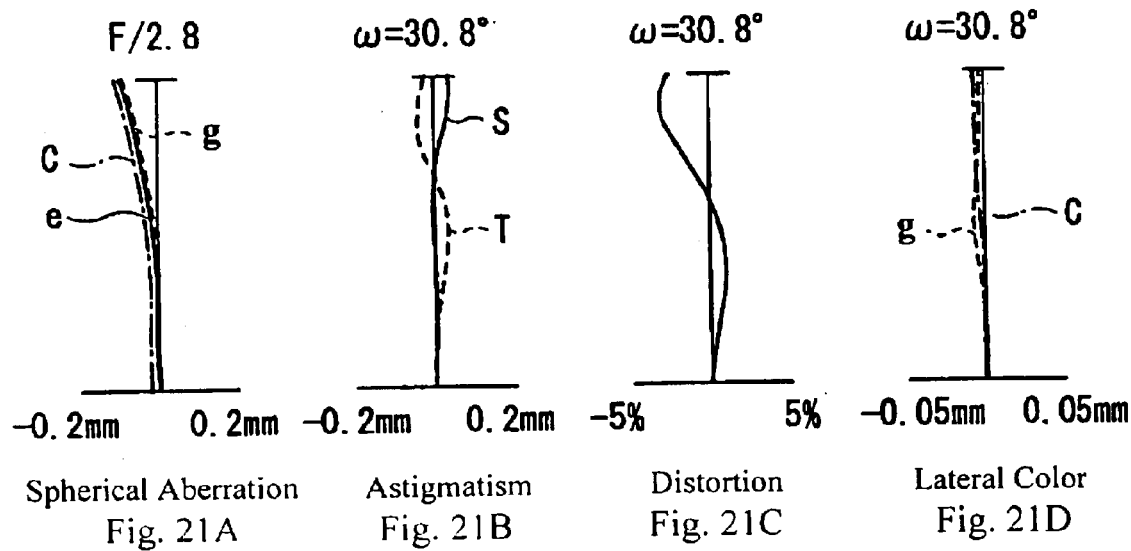
Spherical Aberration Fig. 21A
Astigmatism Fig. 21B
Distortion Fig. 21C
Lateral Color Fig. 21D
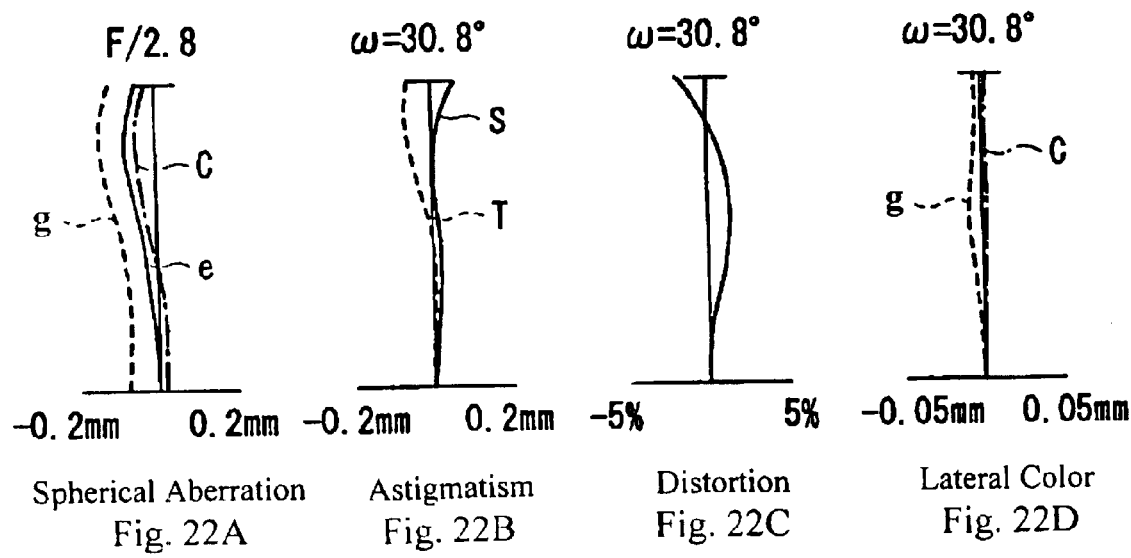
Spherical Aberration Fig. 22A
Astigmatism Fig. 22B
Distortion Fig. 22C
Lateral Color Fig. 22D

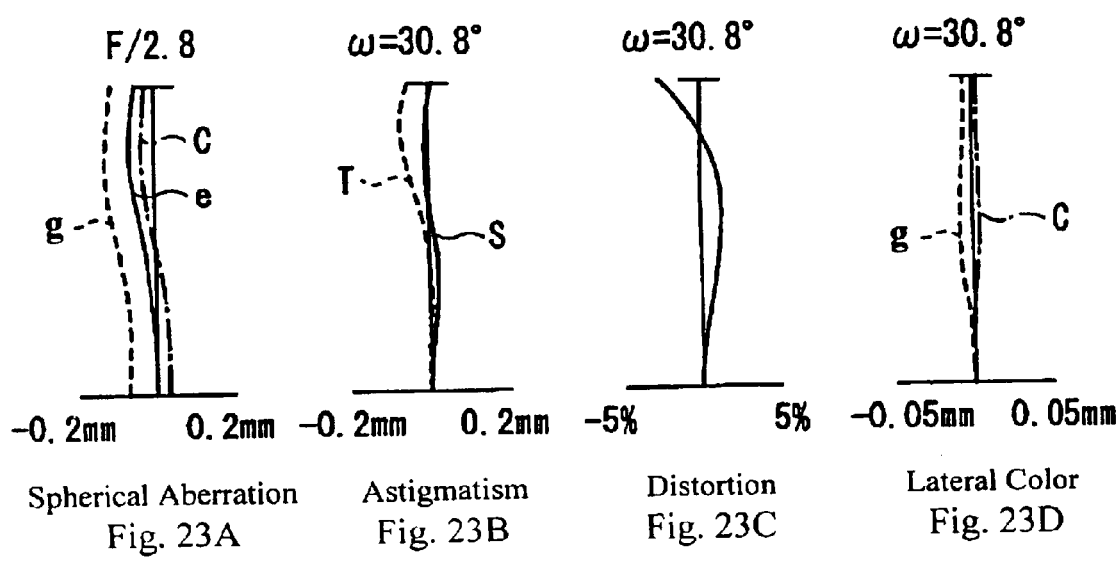

IMAGING LENS FORMED OF APERTURE DIAPHRAGM AND ONLY TWO LENS COMPONENTS

BACKGROUND OF THE INVENTION

Conventionally, an imaging device using an image pickup device, such as a CCD (Charge Coupled Device) or a CMOS (Complementary Metal Oxide Semiconductor), has been known. In such an imaging device, an image of an object is formed on an image pickup device and electronic signals from the image pickup device are processed in order to create image data that may be recorded or further processed to provide an image for viewing. Miniaturization of the image pickup devices has been progressing in recent years in order to make the entire imaging device smaller.

In particular, the miniaturization of module cameras for inputting picture images in cellular phones and digital still cameras (hereinafter referred to as digital cameras) has been remarkable in recent years. Conventionally, the imaging lens used in small imaging devices has been a small, single lens component in order to achieve the desired small size and portability desired. Additionally, in recent years, the performance capabilities of image pickup devices has been improved, and small image pickup devices with higher pixel densities have been developed without increasing the size of the image pickup device. Associated with the realization of higher pixel density, higher optical performance of the imaging lens used with the image pickup device is demanded. However, a small, single lens component does not satisfy the optical performance requirements needed.

Recently, in order to obtain tolerable optical performance for image pickup devices having a high pixel density, consideration has been given to increasing the number of lens components of the imaging lens. However, while increasing the number of lens components enables improvement of the image quality, it is disadvantageous from the standpoint of increasing the overall length of the imaging lens, and may result in the small size and portability of the imaging device being lost. Conventionally, an imaging lens with a high optical performance that is suitable for mounting in a small, image pickup device having a high pixel density has not been fully developed in terms of satisfying the desired miniaturization requirements and providing a satisfactory image quality.

Furthermore, as an imaging lens for an imaging device, the optical performance requirements may not relate solely to the imaging lens itself but may depend on the characteristics of the image pickup device. For example, in the case of using an image pickup device such as a CCD, in general it is desirable that light rays generally are incident onto the image surface of the image pickup device nearly normal to the surface. In other words, it is desirable to secure a telecentric property at the image plane. Therefore, it is desired to develop an imaging lens with various performance capabilities that match with the characteristics of an image pickup device with which the imaging lens may be used.

BRIEF SUMMARY OF THE INVENTION

The present invention relates to an imaging lens with optical performance characteristics suitable for mounting in a small imaging device and for forming a small image onto the small imaging device.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 11A–11D show the spherical aberration, astigmatism, distortion, and lateral color, respectively, of the imaging lens according to Embodiment 1;

FIGS. 12A–12D show the spherical aberration, astigmatism, distortion, and lateral color, respectively, of the imaging lens according to Embodiment 2;

FIGS. 13A–13D show the spherical aberration, astigmatism, distortion, and lateral color, respectively, of the imaging lens according to Embodiment 3;

FIGS. 14A–14D show the spherical aberration, astigmatism, distortion, and lateral color, respectively, of the imaging lens according to Embodiment 4;

FIGS. 15A–15D show the spherical aberration, astigmatism, distortion, and lateral color, respectively, of the imaging lens according to Embodiment 5;

FIGS. 16A–16D show the spherical aberration, astigmatism, distortion, and lateral color, respectively, of the imaging lens according to Embodiment 6;

FIGS. 17A–17D show the spherical aberration, astigmatism, distortion, and lateral color, respectively, of the imaging lens according to Embodiment 7;

FIGS. 18A–18D show the spherical aberration, astigmatism, distortion, and lateral color, respectively, of the imaging lens according to Embodiment 8;

FIGS. 19A–19D show the spherical aberration, astigmatism, distortion, and lateral color, respectively, of the imaging lens according to Embodiment 9;

FIGS. 20A–20D show the spherical aberration, astigmatism, distortion, and lateral color, respectively, of the imaging lens according to Embodiment 10;

FIGS. 21A–21D show the spherical aberration, astigmatism, distortion, and lateral color, respectively, of the imaging lens according to Embodiment 11;

FIGS. 22A–22D show the spherical aberration, astigmatism, distortion, and lateral color, respectively, of the imaging lens according to Embodiment 12; and FIGS. 23A–23D show the spherical aberration, astigmatism, distortion, and lateral color, respectively, of the imaging lens according to Embodiment 13.

DETAILED DESCRIPTION

First, definitions of the terms "lens element" and "lens component" that relate to the following detailed description will be given. The term "lens element" is herein defined as a single transparent mass of refractive material having two opposed refracting surfaces, which surfaces are positioned at least generally transversely of the optical axis of the imaging lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

Figure 1:
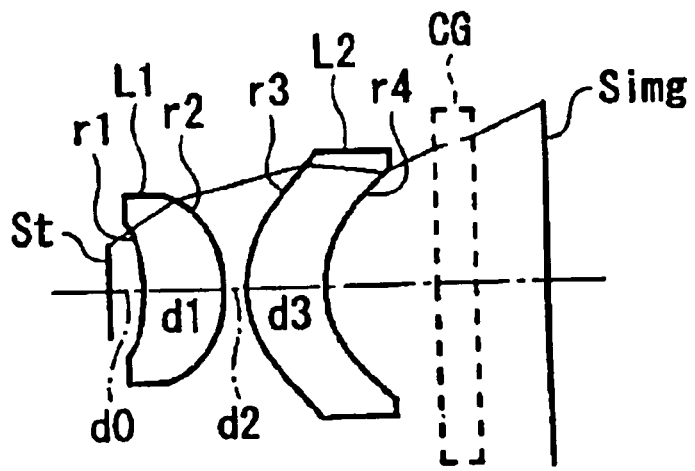
FIG. 1 shows a cross-sectional view of the imaging lens according to Embodiment 1.

A general description of the preferred embodiments of the imaging lens of the present invention will now be described with reference to FIG. 1 that shows Embodiment 1. In FIG. 1, the lens elements are referenced by the symbols L1 and L2, in order from the object side of the imaging lens. Similarly, the radii of curvature of the lens elements are referenced by the letter r followed by a number denoting their order from the object side of the imaging lens, from r1 to r4.

In accordance with the definitions of "lens component," and "lens elements" above, in the thirteen preferred embodiments of the imaging lens of the present invention described below, lens elements L1 and L2 are also lens components. Thus, the present invention may variously be described in terms of lens elements or in terms of lens components.

An aperture diaphragm St is arranged in a position closer to the object side than that of the first lens L1. That is, the aperture diaphragm St is arranged closest to the object side within the imaging lens. Placing the aperture diaphragm St as specified closest to the object side, in front of the first lens element L1, assists in achieving a telecentric property on the image side with a particular image pickup device.

An image pickup device, such as a CCD (not shown), is arranged at the image plane Simg of the imaging lens. A glass or plastic parallel plane cover plate CG for the purpose of protecting an optical filter, or optical filters, and the image pickup device may be inserted between the second lens component L2 and the image plane Simg as indicated by its dotted line representation in FIG. 1. The on-axis surface spacings along the optical axis of the lens surfaces are referenced by the letter d followed by a number denoting their order from the object side of the imaging lens, from d0 to d3.

The four lens surfaces of the first and second lens elements L1 and L2 are aspheric lens surfaces. The four aspheric lens surfaces satisfy the following equation:

$$Z=[(CY^2)/\{1+(1-K \cdot C^2 \cdot Y^2)^{1/2}\}]+A_3Y^3+A_4Y^4+A_5Y^5+A_6Y^6+A_7Y^7+A_8Y^8+A_9Y^9+A_{10}Y^{10} \quad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, r) of the aspheric lens surface near the optical axis, Y is the distance (in mm) from the optical axis, K is the eccentricity, and $A_3$–$A_{10}$ are the third through tenth aspheric coefficients. Additionally, the lens material of each lens element may be either optical glass or plastic. The imaging lenses related to the present invention are designed for images of relatively small dimensions, for example, a diameter of eight millimeters or less so that they are suitable for a small imaging device.

Figure 10:
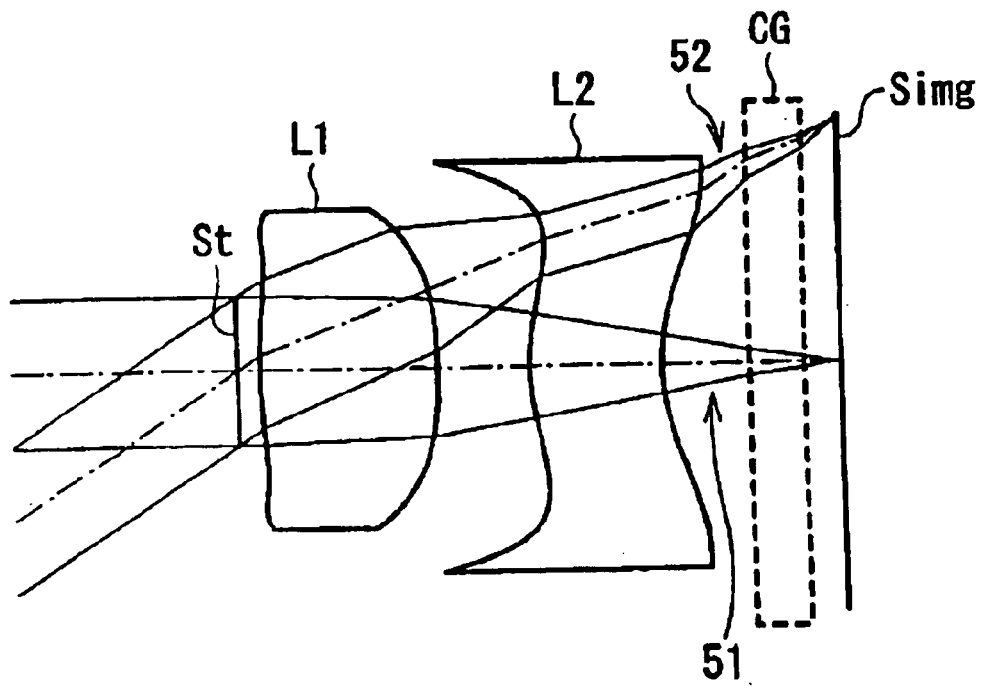
FIG. 10 is a cross-sectional view of the imaging lens according to an embodiment of the present invention with ray tracings related to explaining the imaging lens of the present invention.

With reference to FIG. 10, herein the following phrases have the following meanings with regard to the lens surfaces. The phrase "lens surface configuration near the optical axis" means, for example, a lens surface configuration within the range where a light beam 51 whose angle of view is zero degrees passes through. Further, the phrase "lens surface configuration near the periphery" means, for example, a lens surface configuration within the range of a light beam 52 with a maximum angle of view passes through. Further, the phrase "lens surface configuration of the intermediate portion" means a lens surface configuration in the region between near the optical axis and near the periphery. Because of the breadth of light beam 52 based on the size of the aperture diaphragm St, the lens surface may have different lens surface configurations near the periphery, that is, in the region where the light beam 52 passes. Thus, the phrase "the lens surface configuration near the periphery" may refer to a uniform configuration, such as concave or convex, and the phrase "a lens configuration near the periphery" may refer to configurations where the breadth of the light beam 52 may be large enough to pass through lens surface areas of different curvature, such as both concave and convex.

Thirteen preferred embodiments of the zoom lens of the present invention will now be described with reference to FIGS. 1–9. In FIGS. 1–9, the optical path of the light ray that enters at the maximum angle of view and passes through the top of the aperture diaphragm St is shown, which light ray is also one of the light rays shown in FIG. 10.

Embodiment 1

FIG. 1 shows the basic lens element configuration of an imaging lens of Embodiment 1 of the present invention. As shown in FIG. 1, the lens surface configuration near the optical axis of the object-side lens surface of the first lens element L1 is concave, and the lens surface configuration near the optical axis of the image-side lens surface of the first lens element L1 is convex. Additionally, as shown in FIG. 1, the lens surface configuration near the optical axis of the object-side lens surface of the second lens element L2 is convex, and the lens surface configuration near the optical axis of the image-side lens surface of the second lens element L2 is concave.

Table 1 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 1. Listed in the bottom portion of Table 1 are the focal length f, the f-number $F_{NO}$, the back focal distance (Bf), the maximum image angle 2ω, and the total on-axis distance from the aperture diaphragm St to the image plane Simg (TCL) for Embodiment 1. The thickness of the glass or plastic cover plate CG is 0.35 mm and its refractive index is 1.51872.

TABLE 1

| # | r | d | $N_e$ | $v_d$ |
|---|---|---|---|---|
| 0 (stop) | ∞ | 0.3000 | | |
| 1 | −1.7118 | 0.7000 | 1.52876 | 51.0 |
| 2 | −1.1771 | 0.2000 | | |
| 3 | 1.0546 | 0.7000 | 1.49227 | 57.5 |
| 4 | 1.2151 | | | |
| f = 2.450 mm | $F_{NO}$ = 2.8 | Bf = 1.872 mm | 2ω = 67° | TCL = 3.772 mm |

Table 2 below lists the values of the constants K, $A_4$, $A_6$, $A_8$, and $A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_4$ | $A_6$ | $A_8$ | $A_{10}$ |
|---|---|---|---|---|---|
| 1 | 5.46236 | 3.16167E−2 | −3.14787E−2 | −5.87570E−1 | −2.21697 |
| 2 | 1.84382 | −1.55226E−2 | −9.66662E−2 | 7.29696E−2 | 0.00000 |
| 3 | 2.30137E−1 | 1.85719E−2 | −4.17506E−2 | −4.83449E−3 | 0.00000 |
| 4 | 1.08370 | 2.10920E−1 | −1.72799E−1 | −4.54405E−2 | 0.00000 |

FIGS. 11A–11D show the spherical aberration, astigmatism, distortion, and lateral color, respectively, of the imaging lens according to Embodiment 1. In FIG. 11A, the spherical aberration is shown for the e-line (λ=546.07 nm), the g-line (λ=435.8 nm), and the C-line (λ=656.3 nm). As shown in FIG. 11A the f-number of this embodiment is 2.8. In FIG. 11B, the astigmatism is shown at the e-line (λ=546.07 nm) for both the sagittal image surface S and the tangential image surface T. In FIG. 11C the distortion is shown at the e-line (λ=546.07 nm). FIG. 11D shows the lateral color at the g-line (λ=435.8 nm) and at the C-line (λ=656.3 nm). The half-image angle ω for this embodiment is 33.3°.

As is clear from the lens data and aberration curves discussed above, in Embodiment 1 the various aberrations are favorably corrected, and performance capabilities that are suitable for a small imaging device can be obtained. In particular, an imaging lens related to Embodiment 1 of the present invention is effective in achieving the following results as compared to other imaging lenses: (1) distortion aberration can be smaller; (2) the length from the front end of the optical system to the image plane can be comparatively shorter; and (3) the field curvature can be comparatively smaller.

Embodiment 2

Figure 2:
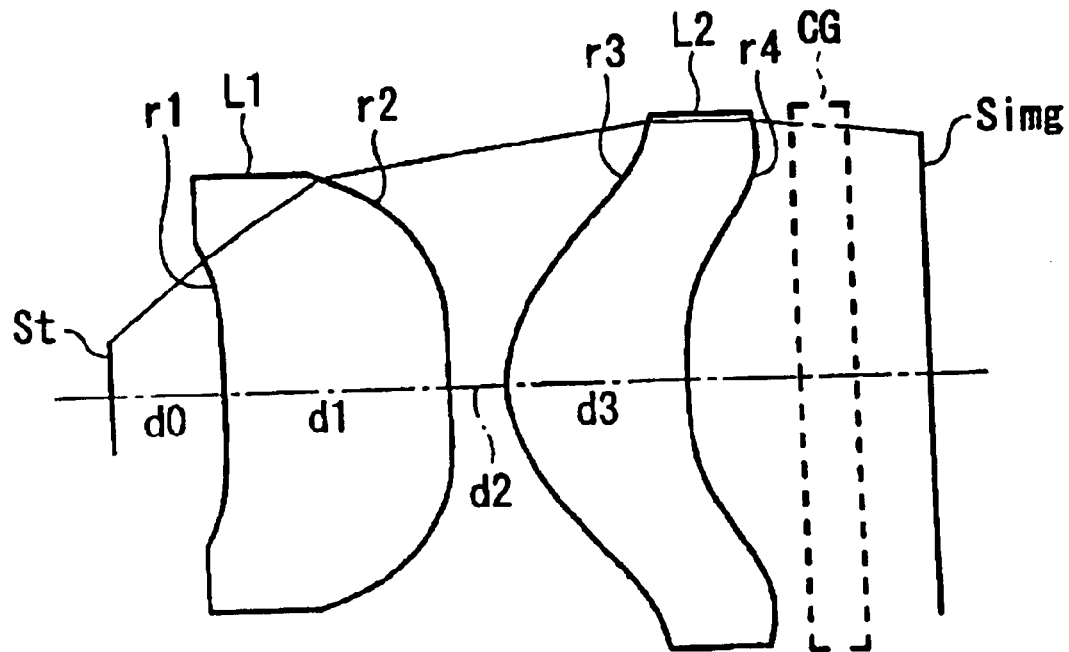
FIG. 2 shows a cross-sectional view of the imaging lens according to Embodiment 2.

FIG. 2 shows the basic lens element configuration of an imaging lens of Embodiment 2 of the present invention. As shown in FIG. 2, the lens surface configuration near the optical axis of the object-side lens surface of the first lens element L1 is concave, the lens surface configuration near the optical axis of the image-side lens surface of the first lens element L1 is concave, and the lens surface configuration near the periphery of the image-side lens surface of the first lens element L1 is convex. Additionally, as shown in FIG. 1, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is concave, and the lens surface configuration near the periphery of the image-side lens surface of the second lens element L2 is convex.

Table 3 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 2. Listed in the bottom portion of Table 3 are the focal length f, the f-number $F_{NO}$, the back focal distance (Bf), the maximum image angle 2ω, and the total on-axis distance from the aperture diaphragm St to the image plane Simg (TCL) for Embodiment 2. The thickness of the glass or plastic cover plate CG is 0.50 mm and its refractive index is 1.51872.

TABLE 3

| # | r | d | $N_e$ | $v_d$ |
|---|---|---|---|---|
| 0 (stop) | ∞ | 1.0000 | | |
| 1 | −22.1504 | 2.0000 | 1.52876 | 51.0 |
| 2 | 9.9568 | 0.5251 | | |
| 3 | 1.2576 | 1.6000 | 1.52876 | 51.0 |
| 4 | 13.1487 | | | |
| f = 2.900 mm | $F_{NO}$ = 2.8 | Bf = 1.980 mm | 2ω = 69° | TCL = 7.105 mm |

Table 4 below lists the values of the constants K, $A_4$, $A_6$, $A_8$, and $A_{10}$ used in Equation (A) above for each of the aspheric lens surfaces of Table 3. Aspheric coefficients that are not present in Table 4 are zero. An "E" in the data indicates that the number following the "E" is the exponent to the base 10. For example, "1.0E-2" represents the number $1.0 \times 10^{-2}$.

TABLE 4

| # | K | $A_4$ | $A_6$ | $A_8$ | $A_{10}$ |
|---|---|---|---|---|---|
| 1 | −5.73914 | −1.61356E−2 | −5.66824E−3 | −2.00846E−2 | 8.20392E−3 |
| 2 | 4.50936E−1 | −1.44417E−1 | 3.20510E−2 | −4.39887E−3 | −3.17440E−5 |
| 3 | −2.35265E−2 | −3.63811E−2 | 1.27095E−2 | −3.60835E−3 | 2.90231E−4 |
| 4 | 3.72018E−1 | 1.62654E−1 | −5.28833E−2 | 6.10245E−3 | −2.48354E−4 |

FIGS. 12A–12D show the spherical aberration, astigmatism, distortion, and lateral color, respectively, of the imaging lens according to Embodiment 2. In FIG. 12A, the spherical aberration is shown for the e-line (λ=546.07 nm), the g-line (λ=435.8 nm), and the C-line (λ=656.3 nm). As shown in FIG. 12A the f-number of this embodiment is 2.8. In FIG. 12B, the astigmatism is shown at the e-line (λ=546.07 nm) for both the sagittal image surface S and the tangential image surface T. In FIG. 12C the distortion is shown at the e-line (λ=546.07 nm). FIG. 12D shows the lateral color at the g-line (λ=435.8 nm) and at the C-line (λ=656.3 nm). The half-image angle ω for this embodiment is 34.6°.

As is clear from the lens data and aberration curves discussed above, in Embodiment 2 of the imaging lens of the present invention, the various aberrations are well corrected, and performance capabilities that are suitable for a small imaging device can be obtained. In particular, an imaging lens related to Embodiment 2 of the present invention is effective in achieving the following results as compared to other imaging lenses: (1) the angle of incidence of a luminous flux that strikes the image plane can be smaller, and a sufficient quantity of light can be obtained by the image pickup device even at the periphery of the image plane; and (2) the field curvature can be comparatively smaller.

Embodiment 3

Figure 3:
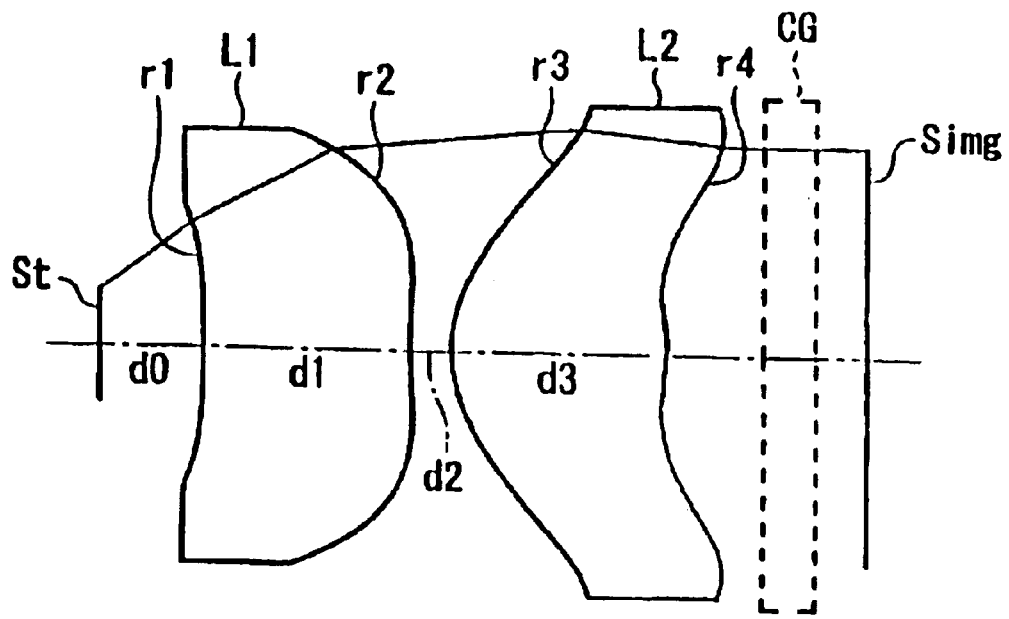
FIG. 3 shows a cross-sectional view of the imaging lens according to Embodiment 3.

FIG. 3 shows the basic lens element configuration of an imaging lens of Embodiment 3 of the present invention. As shown in FIG. 3, the lens surface configuration near the optical axis of the object-side lens surface of the first lens element L1 is concave, the lens surface configuration near the optical axis of the image-side lens surface of the first lens element L1 is concave, and the lens surface configuration near the periphery of the image-side lens surface of the first lens element L1 is convex. Additionally, as shown in FIG. 3, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is convex, the lens surface configuration near the periphery of the image-side lens surface of the second lens element L2 is convex, and the lens surface configuration of the intermediate portion of the image-side lens surface of the second lens element L2 is concave.

Table 5 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 3. Listed in the bottom portion of Table 5 are the focal length f, the f-number $F_{NO}$, the back focal distance (Bf), the maximum image angle 2ω, and the total on-axis distance from the aperture diaphragm St to the image plane Simg (TCL) for Embodiment 3. The thickness of the glass or plastic cover plate CG is 0.50 mm and its refractive index is 1.51872.

TABLE 5

| # | r | d | $N_e$ | $v_d$ |
|---|---|---|---|---|
| 0 (stop) | ∞ | 1.0000 | | |
| 1 | −31.2953 | 2.0000 | 1.52876 | 51.0 |
| 2 | 5.2695 | 0.3910 | | |
| 3 | 1.2602 | 1.8000 | 1.52876 | 51.0 |
| 4 | −22.7601 | | | |
| f = 2.900 mm | $F_{NO}$ = 2.8 | Bf = 1.976 mm | 2ω = 69° | TCL = 7.167 mm |

Table 6 below lists the values of the constants K, $A_4$, $A_6$, $A_8$, and $A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

TABLE 6

| # | K | $A_4$ | $A_6$ | $A_8$ | $A_{10}$ |
|---|---|---|---|---|---|
| 1 | −5.73912 | −1.85911E−2 | −5.48212E−3 | −1.83873E−2 | 8.08687E−3 |
| 2 | 4.50339E−1 | −1.46805E−1 | 3.08450E−2 | −4.43517E−3 | 6.52813E−5 |
| 3 | −1.00899E−1 | −3.84242E−2 | 1.31613E−2 | −2.95136E−3 | 1.84241E−4 |
| 4 | 3.72036E−1 | 1.70153E−1 | −5.01230E−2 | 5.44566E−3 | −2.23659E−4 |

FIGS. 13A–13D show the spherical aberration, astigmatism, distortion, and lateral color, respectively, of the imaging lens according to Embodiment 3. In FIG. 13A, the spherical aberration is shown for the e-line (λ=546.07 nm), the g-line (λ=435.8 nm), and the C-line (λ=656.3 nm). As shown in FIG. 13A the f-number of this embodiment is 2.8. In FIG. 13B, the astigmatism is shown at the e-line (λ=546.07 nm) for both the sagittal image surface S and the tangential image surface T. In FIG. 13C the distortion is shown at the e-line (λ=546.07 nm). FIG. 13D shows the lateral color at the g-line (λ=435.8 nm) and at the C-line (λ=656.3 nm). The half-image angle ω for this embodiment is 34.6°.

As is clear from the lens data and aberration curves discussed above, in Embodiment 3 of the imaging lens of the present invention, the various aberrations are well corrected, and performance capabilities that are suitable for a small imaging device can be obtained. In particular, an imaging lens related to Embodiment 3 of the present invention is effective in achieving the following results as compared to other imaging lenses: (1) the angle of incidence of a luminous flux that strikes the image plane can be smaller, and a sufficient quantity of light can be obtained by the image pickup device even at the periphery of the image plane; and (2) the field curvature can be comparatively smaller.

Embodiment 4

Figure 24:
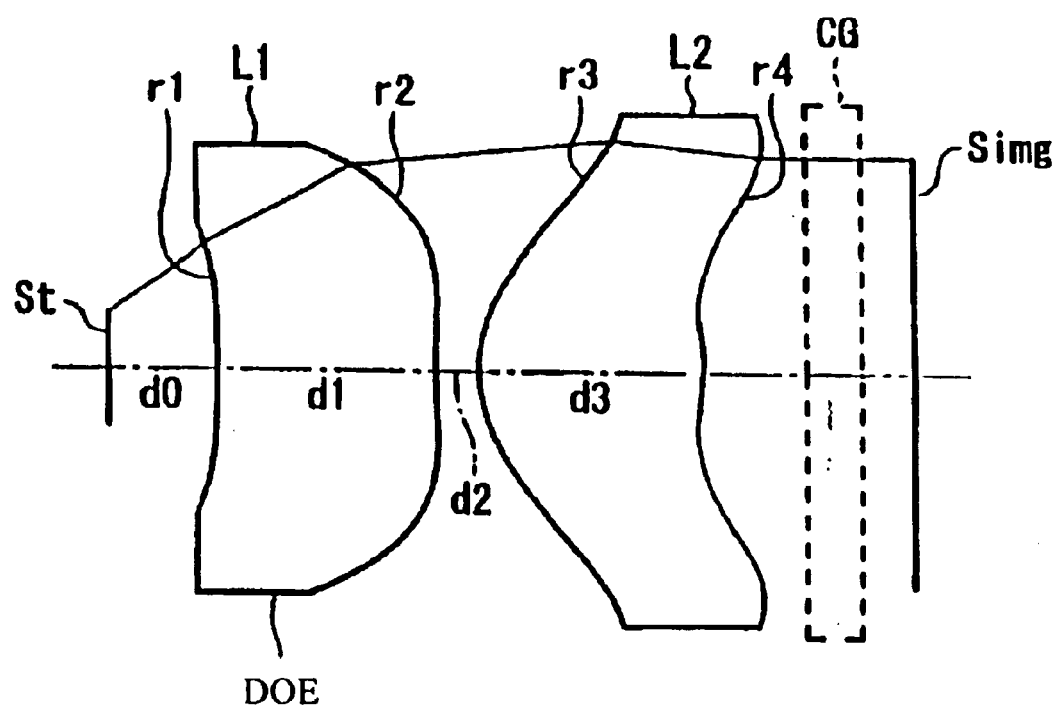
FIG. 24 shows a cross-sectional view of the imagine lens according to Embodiment 4.

Embodiment 4 is very similar to Embodiment 3 and differs from Embodiment 3 in its lens element configuration only by different radii of curvature of the lens surfaces, different eccentricities and aspheric coefficients of the aspheric lens surfaces, different refractive indexes and different Abbe numbers of the lens materials, a different thickness of lens element L2, and the object-side lens surface of lens element L1 being a diffractive optical surface. FIG. 24 illustrates this embodiment.

By making at least one of the lens surfaces of the first lens element L1 and the second lens element L2 to be a diffractive optical surface, excellent correction of lateral color can be obtained, color blur decreased, and image quality, such as image resolution, can be improved. The diffractive optical surface is formed so that the diffractive optical surface adds an optical path length OPL that varies with the distance from the optical axis according to the following equation:

$$OPL = (C01 \cdot Y \cdot \lambda)/2\pi \qquad \text{Equation (B)}$$

where

C01 is the DOE (diffractive optical element) constant,

Y is the distance (in mm) from the optical axis, and $\lambda$ is the wavelength of the light being imaged.

In Embodiment 4, the DOE constant of the object-side lens surface of lens element L1 is −237.812.

Table 7 below lists the surface number #, in order from the object side, the radius of curvature r (in mm) of each surface near the optical axis, the on-axis surface spacing d (in mm), as well as the refractive index $N_e$ (at the e-line of $\lambda$=546.1 nm) and the Abbe number $\nu_d$ (at the d-line of $\lambda$=587.6 nm) of each lens element for Embodiment 4. Listed in the bottom portion of Table 7 are the focal length f, the f-number $F_{NO}$, the back focal distance (Bf), the maximum image angle $2\omega$, and the total on-axis distance from the aperture diaphragm St to the image plane Simg (TCL) for Embodiment 4. The thickness of the glass or plastic cover plate CG is 0.50 mm and its refractive index is 1.51872.

TABLE 7

| # | r | d | $N_e$ | $\nu_d$ |
|---|---|---|---|---|
| 0 (stop) | ∞ | 1.0000 | | |
| 1 | −11.6877 | 2.0000 | 1.53331 | 64.6 |
| 2 | 4.7916 | 0.3910 | | |
| 3 | 1.2650 | 2.0000 | 1.53331 | 64.6 |
| 4 | −17.9564 | | | | f = 2.895 mm   $F_{NO}$ = 2.8   Bf = 1.808 mm   $2\omega$ = 69°   TCL = 7.199 mm Table 8 below lists the values of the constants K, $A_4$, $A_6$, $A_8$, and $A_{10}$ used in Equation (A) above for each of the aspheric lens surfaces of Table 7. Aspheric coefficients that are not present in Table 8 are zero. An "E" in the data indicates that the number following the "E" is the exponent to the base 10. For example, "1.0E-2" represents the number $1.0 \times 10^{-2}$.

TABLE 8

| # | K | $A_4$ | $A_6$ | $A_8$ | $A_{10}$ |
|---|---|---|---|---|---|
| 1 | −5.73911 | −1.96423E−2 | −5.52092E−3 | −1.73933E−2 | 9.10823E−3 |
| 2 | 4.51049E−1 | −1.45530E−1 | 3.29461E−2 | −5.70002E−3 | 3.17682E−4 |
| 3 | −1.30507E−1 | −3.92555E−2 | 1.28950E−2 | −2.83396E−3 | 1.96295E−4 |
| 4 | 3.72035E−1 | 1.70269E−1 | −5.08813E−2 | 5.87775E−3 | −2.64482E−4 |

FIGS. 14A–14D show the spherical aberration, astigmatism, distortion, and lateral color, respectively, of the imaging lens according to Embodiment 4. In FIG. 14A, the spherical aberration is shown for the e-line ($\lambda$=546.07 nm), the g-line ($\lambda$=435.8 nm), and the C-line ($\lambda$=656.3 nm). As shown in FIG. 14A the f-number of this embodiment is 2.8. In FIG. 14B, the astigmatism is shown at the e-line ($\lambda$=546.07 nm) for both the sagittal image surface S and the tangential image surface T. In FIG. 14C the distortion is shown at the e-line ($\lambda$=546.07 nm). FIG. 14D shows the lateral color at the g-line ($\lambda$=435.8 nm) and at the C-line ($\lambda$=656.3 nm). The half-image angle $\omega$ for this embodiment is 34.6°.

As is clear from the lens data and aberration curves discussed above, in Embodiment 4 of the imaging lens of the present invention, the various aberrations are well corrected, and performance capabilities that are suitable for a small imaging device can be obtained. In particular, an imaging lens related to Embodiment 4 of the present invention is effective in achieving the following results as compared to other imaging lenses: (1) the angle of incidence of a luminous flux that strikes the image plane can be smaller, and a sufficient quantity of light can be obtained by the image pickup device even at the periphery of the image plane; and (2) the field curvature can be comparatively smaller.

Embodiment 5

Figure 4:
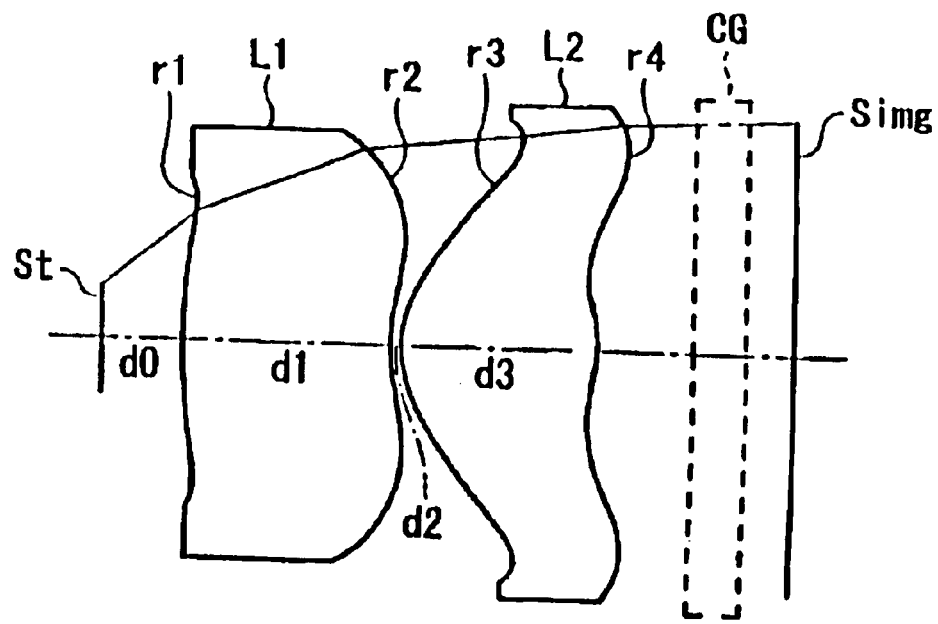
FIG. 4 shows a cross-sectional view of the imaging lens according to Embodiments 5 and 6.

FIG. 4 shows the basic lens element configuration of an imaging lens of Embodiment 5 of the present invention. As shown in FIG. 4, the lens surface configuration near the optical axis of the object-side lens surface of the first lens element L1 is convex, the lens surface configuration near the optical axis of the image-side lens surface of the first lens element L1 is concave, and the lens surface configuration near the periphery of the image-side lens surface of the first lens element L1 is convex. Additionally, as shown in FIG. 4, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is convex, the lens surface configuration near the periphery of the image-side lens surface of the second lens element L2 is convex, and the lens surface configuration of the intermediate portion of the image-side lens surface of the second lens element L2 is concave.

Table 9 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 5. Listed in the bottom portion of Table 9 are the focal length f, the f-number $F_{NO}$, the back focal distance (Bf), the maximum image angle 2ω, and the total on-axis distance from the aperture diaphragm St to the image plane Simg (TCL) for Embodiment 5. The thickness of the glass or plastic cover plate CG is 0.50 mm and its refractive index is 1.51872.

TABLE 9

| # | r | d | $N_e$ | $v_d$ |
|---|---|---|---|---|
| 0 (stop) | ∞ | 0.8000 | | |
| 1 | 7.7504 | 2.0000 | 1.52876 | 51.0 |
| 2 | 2.0368 | 0.1000 | | |
| 3 | 1.1267 | 1.8000 | 1.52876 | 51.0 |
| 4 | −4.1703 | | | |
| f = 2.900 mm | $F_{NO}$ = 2.8 | Bf = 1.778 mm | 2ω = 69° | TCL = 6.478 mm |

Table 10 below lists the values of the constants K, $A_4$, $A_6$, $A_8$, and $A_{10}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E−2" represents the number $1.0×10^{-2}$.

TABLE 10

| # | K | $A_4$ | $A_6$ | $A_8$ | $A_{10}$ |
|---|---|---|---|---|---|
| 1 | −5.73784 | 6.70437E−3 | 5.51845E−3 | −3.92123E−3 | −5.55102E−4 |
| 2 | 3.83888E−1 | −1.51962E−1 | 2.01089E−2 | 1.70547E−4 | −3.47513E−4 |
| 3 | −3.07421E−1 | −4.33825E−2 | 1.70826E−2 | −2.98983E−3 | 2.01933E−5 |
| 4 | 3.58809E−1 | 2.03103E−1 | −5.88102E−2 | 6.21637E−3 | −2.28695E−4 |

FIGS. 15A–15D show the spherical aberration, astigmatism, distortion, and lateral color, respectively, of the imaging lens according to Embodiment 5. In FIG. 15A, the spherical aberration is shown for the e-line (λ=546.07 nm), the g-line (λ=435.8 nm), and the C-line (λ=656.3 nm). As shown in FIG. 15A the f-number of this embodiment is 2.8. In FIG. 15B, the astigmatism is shown at the e-line (λ=546.07 nm) for both the sagittal image surface S and the tangential image surface T. In FIG. 15C the distortion is shown at the c-line (λ=546.07 nm). FIG. 15D shows the lateral color at the g-line (λ=435.8 nm) and at the C-line (λ=656.3 nm). The half-image angle ω for this embodiment is 34.6°.

As is clear from the lens data and aberration curves discussed above, in Embodiment 5 of the imaging lens of the present invention, the various aberrations are well corrected, and performance capabilities that are suitable for a small imaging device can be obtained. In particular, an imaging lens related to Embodiment 5 of the present invention is effective in achieving the following results as compared to other imaging lenses: (1) the angle of incidence of a luminous flux that strikes the image plane can be smaller, and a sufficient quantity of light can be obtained by the image pickup device even at the periphery of the image plane; and (2) the field curvature can be comparatively smaller.

Embodiment 6

Embodiment 6 is very similar to Embodiment 5 and differs from Embodiment 5 in its lens element configuration only by different radii of curvature of lens surfaces, different eccentricities and aspheric coefficients of the aspheric lens surfaces, and some different optical element surface spacings. Therefore, Embodiment 6 is well shown by FIG. 4.

Table 11 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 6. Listed in the bottom portion of Table 11 are the focal length f, the f-number $F_{NO}$, the back focal distance (Bf), the maximum image angle 2ω, and the total on-axis distance from the aperture diaphragm St to the image plane Simg (TCL) for Embodiment 6. The thickness of the glass or plastic cover plate CG is 0.50 mm and its refractive index is 1.51872.

TABLE 11

| # | r | d | $N_e$ | $v_d$ |
|---|---|---|---|---|
| 0 (stop) | ∞ | 0.8000 | | |
| 1 | 11.2013 | 1.5000 | 1.52876 | 51.0 |
| 2 | 2.1137 | 0.1730 | | |
| 3 | 1.1479 | 1.8000 | 1.52876 | 51.0 |
| 4 | −4.3873 | | | |

TABLE 11-continued

| # | r | d | $N_e$ | $v_d$ |
|---|---|---|---|---|
| f = 2.900 mm | $F_{NO}$ = 2.8 | Bf = 1.963 mm | 2ω = 69° | TCL = 6.236 mm |

Table 12 below lists the values of the constants K, $A_4$, $A_6$, $A_8$, and $A_{10}$ used in Equation (A) above for each of the aspheric lens surfaces of Table 11. Aspheric coefficients that are not present in Table 12 are zero. An "E" in the data indicates that the number following the "E" is the exponent to the base 10. For example, "1.0E-2" represents the number $1.0 \times 10^{-2}$.

TABLE 12

| # | K | $A_4$ | $A_6$ | $A_8$ | $A_{10}$ |
|---|---|---|---|---|---|
| 1 | −5.73781 | 5.29184E−3 | −1.30161E−3 | 1.82677E−3 | −8.21953E−3 |
| 2 | 2.49407E−1 | −1.69505E−1 | 2.71991E−2 | 3.06687E−4 | −1.13938E−3 |
| 3 | −2.93041E−1 | −4.44795E−2 | 1.09101E−2 | −9.58117E−4 | −3.54885E−4 |
| 4 | 3.70722E−1 | 1.91238E−1 | −7.06007E−2 | 1.05705E−2 | −6.37682E−4 |

FIGS. 16A–16D show the spherical aberration, astigmatism, distortion, and lateral color, respectively, of the imaging lens according to Embodiment 6. In FIG. 16A, the spherical aberration is shown for the e-line (λ=546.07 nm), the g-line (λ=435.8 nm), and the C-line (λ=656.3 nm). As shown in FIG. 16A the f-number of this embodiment is 2.8. In FIG. 16B, the astigmatism is shown at the e-line (λ=546.07 nm) for both the sagittal image surface S and the tangential image surface T. In FIG. 16C the distortion is shown at the e-line (λ=546.07 nm). FIG. 16D shows the lateral color at the g-line (λ=435.8 nm) and at the C-line (λ=656.3 nm). The half-image angle ω for this embodiment is 34.6°.

As is clear from the lens data and aberration curves discussed above, in Embodiment 6 of the imaging lens of the present invention, the various aberrations are well corrected, and performance capabilities that are suitable for a small imaging device can be obtained. In particular, an imaging lens related to Embodiment 6 of the present invention is effective in achieving the following results as compared to other imaging lenses: (1) the angle of incidence of a luminous flux that strikes the image plane can be smaller, and a sufficient quantity of light can be obtained by the image pickup device even at the periphery of the image plane; and (2) the field curvature can be comparatively smaller.

Embodiment 7

Figure 5:
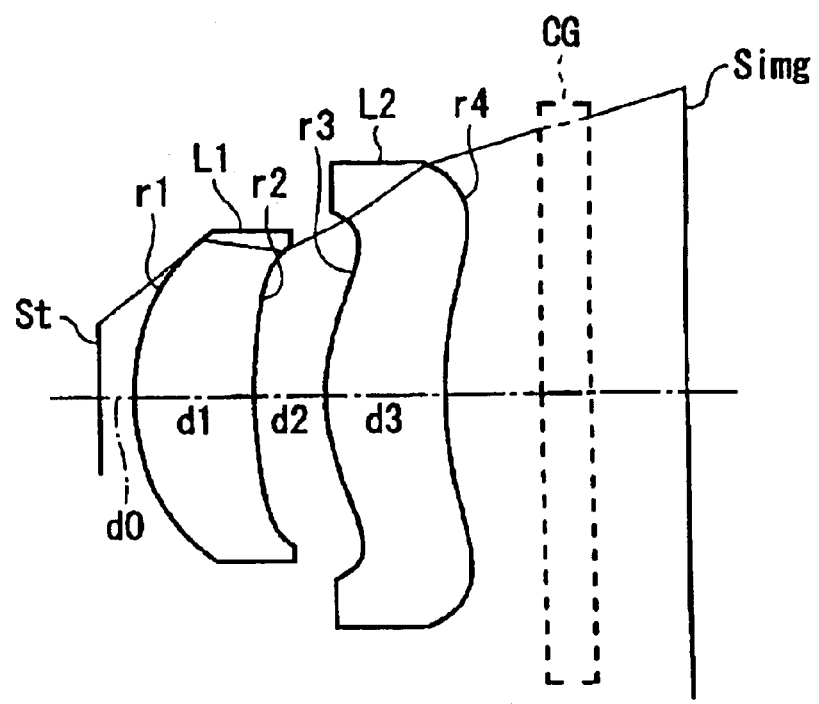
FIG. 5 shows a cross-sectional view of the imaging lens according to Embodiment 7.

FIG. 5 shows the basic lens element configuration of an imaging lens of Embodiment 7 of the present invention. As shown in FIG. 5, the lens surface configuration near the optical axis of the object-side lens surface of the first lens element L1 is convex, the lens surface configuration near the optical axis of the image-side lens surface of the first lens element L1 is concave, and the lens surface configuration near the periphery of the image-side lens surface of the first lens element L1 is concave. Additionally, as shown in FIG. 5, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is concave, and the lens surface configuration near the periphery of the image-side lens surface of the second lens element L2 is convex.

Table 13 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 7. Listed in the bottom portion of Table 13 are the focal length f, the f-number $F_{NO}$, the back focal distance (Bf), the maximum image angle 2ω, and the total on-axis distance from the aperture diaphragm St to the image plane Simg (TCL) for Embodiment 7. The thickness of the glass or plastic cover plate CG is 0.50 mm and its refractive index is 1.51872.

TABLE 13

| # | r | d | $N_e$ | $v_d$ |
|---|---|---|---|---|
| 0 (stop) | ∞ | 0.3508 | | |
| 1 | 2.6363 | 1.2000 | 1.51081 | 56.0 |
| 2 | 4.5145 | 0.7127 | | |
| 3 | 2.0959 | 1.2014 | 1.51081 | 56.0 |
| 4 | 5.6949 | | | |
| f = 4.200 mm | $F_{NO}$ = 2.8 | Bf = 2.301 mm | 2ω = 69° | TCL = 5.766 mm |

Table 14 below lists the values of the constants K, $A_4$, $A_6$, $A_8$, and $A_{10}$ used in Equation (A) above for each of the aspheric lens surfaces of Table 13. Aspheric coefficients that are not present in Table 14 are zero. An "E" in the data indicates that the number following the "E" is the exponent to the base 10. For example, "1.0E-2" represents the number $1.0 \times 10^{-2}$.

TABLE 14

| # | K | $A_4$ | $A_6$ | $A_8$ | $A_{10}$ |
|---|---|---|---|---|---|
| 1 | −5.25973 | 4.05541E−2 | 6.15047E−3 | −1.23399E−3 | 7.60464E−6 |
| 2 | 9.67175E−2 | −4.52384E−2 | 1.91970E−2 | 1.08049E−3 | 9.21900E−4 |
| 3 | −3.75860E−1 | −2.16034E−2 | −9.27519E−3 | 5.15785E−3 | −1.44464E−3 |
| 4 | 2.55897E−1 | 3.62277E−2 | −1.99749E−2 | 3.19498E−3 | −2.55817E−4 |

FIGS. 17A–17D show the spherical aberration, astigmatism, distortion, and lateral color, respectively, of the imaging lens according to Embodiment 7. In FIG. 17A, the spherical aberration is shown for the e-line (λ=546.07 nm), the g-line (λ=435.8 nm), and the C-line (λ=656.3 nm). As shown in FIG. 17A the f-number of this embodiment is 2.8. In FIG. 17B, the astigmatism is shown at the e-line (λ=546.07 nm) for both the sagittal image surface S and the tangential image surface T. In FIG. 17C the distortion is shown at the e-line (λ=546.07 nm). FIG. 17D shows the lateral color at the g-line (λ=435.8 nm) and at the C-line (λ=656.3 nm). The half-image angle ω for this embodiment is 34.6°.

As is clear from the lens data and aberration curves discussed above, in Embodiment 7 of the imaging lens of the present invention, the various aberrations are well corrected, and performance capabilities that are suitable for a small imaging device can be obtained. In particular, an imaging lens related to Embodiment 7 of the present invention is effective in achieving the following results as compared to other imaging lenses: (1) the distortion aberration can be comparatively smaller; (2) the length from the front end of the optical system to the image plane can be shorter; and (3) the lateral color can be comparatively smaller even if only a single lens material is used.

Embodiment 8

Figure 6:
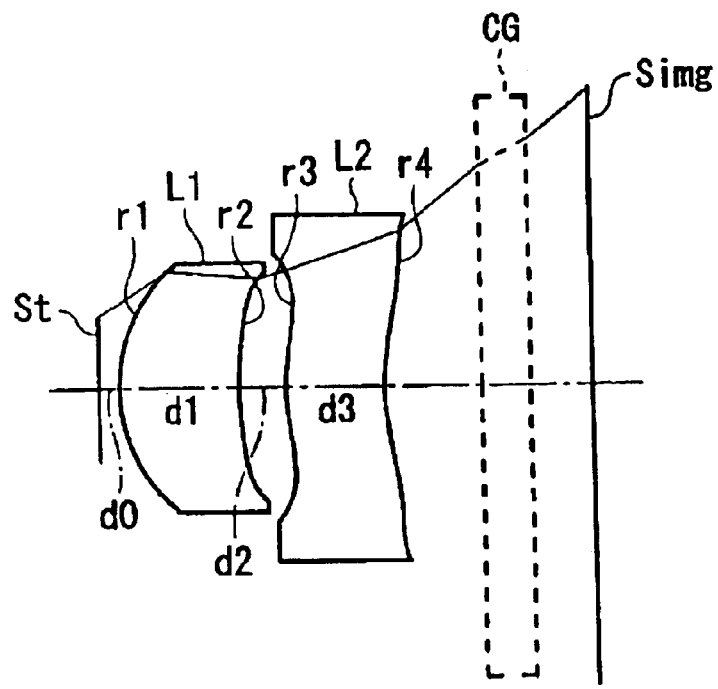
FIG. 6 shows a cross-sectional view of the imaging lens according to Embodiments 8 and 9.

FIG. 6 shows the basic lens element configuration of an imaging lens of Embodiment 8 of the present invention. As shown in FIG. 6, the lens surface configuration near the optical axis of the object-side lens surface of the first lens element L1 is convex, the lens surface configuration near the optical axis of the image-side lens surface of the first lens element L1 is concave, and the lens surface configuration near the periphery of the image-side lens surface of the first lens element L1 is concave. Additionally, as shown in FIG. 6, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is concave, the lens surface configuration of the intermediate portion and a lens surface configuration near the periphery of the image-side lens surface of the second lens element L2 is convex, and a lens surface configuration even nearer the periphery of the image-side lens surface of the second lens element L2 is concave, as shown by the refracted light ray at r4 of FIG. 6 diverging slightly as it exits the second lens component L2.

Thus Embodiment 8, as described above, is similar to Embodiment 7 shown in FIG. 5. However, as shown in FIG. 6, the very peripheral portion of the image-side lens surface of the second lens element L2 may deviate from the convex shape. Even so, in accordance with the meaning given the phrase "lens surface configuration near the periphery" above as, for example, a lens surface configuration within the range of a light beam 52 with a maximum angle of view passes through as shown in FIG. 10, a lens surface configuration near the periphery of the image-side lens surface of the second lens element L2 in Embodiment 8 is convex. That is, a distinction may be made between "a lens surface configuration near the periphery" and "the lens surface configuration near the periphery" with regard to Embodiment 8, as well as with regard to Embodiment 9 that will be described later.

Table 15 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 8. Listed in the bottom portion of Table 15 are the focal length f, the f-number $F_{NO}$, the back focal distance (Bf), the maximum image angle 2ω, and the total on-axis distance from the aperture diaphragm St to the image plane Simg (TCL) for Embodiment 8. The thickness of the glass or plastic cover plate CG is 0.50 mm and its refractive index is 1.51872.

TABLE 15

| # | r | d | $N_e$ | $v_d$ |
|---|---|---|---|---|
| 0 (stop) | ∞ | 0.3000 | | |
| 1 | 2.2884 | 1.3145 | 1.51081 | 56.0 |
| 2 | 3.2566 | 0.5850 | | |
| 3 | 1.7641 | 1.2000 | 1.51081 | 56.0 |
| 4 | 3.3750 | | | |
| f = 4.200 mm | $F_{NO}$ = 2.8 | Bf = 2.100 mm | 2ω = 69° | TCL = 5.499 mm |

Table 16 below lists the values of the constants K, $A_4$, $A_6$, $A_8$, and $A_{10}$ used in Equation (A) above for each of the aspheric lens surfaces (#1 and #2) of lens element L1 of Table 15, and Table 17 below lists the values of the constants K and $A_3$–$A_{10}$ used in Equation (A) above for each of the aspheric lens surfaces (#3 and #4) of lens element L2 of Table 15. Aspheric coefficients that are not present in Tables 16 and 17 are zero. An "E" in the data indicates that the number following the "E" is the exponent to the base 10. For example, "1.0E-2" represents the number $1.0 \times 10^{-2}$.

TABLE 16

| # | K | $A_4$ | $A_6$ | $A_8$ | $A_{10}$ |
|---|---|---|---|---|---|
| 1 | −2.84304 | 6.26507E−2 | −7.19804E−3 | −2.66734E−3 | 5.90432E−4 |
| 2 | 1.64448E−2 | −4.47957E−2 | 3.98830E−2 | 3.52573E−3 | −3.75426E−3 |

TABLE 17

| Aspheric Factor | #3 | #4 |
|---|---|---|
| K | −6.60892E−1 | 3.92356E−1 |
| $A_3$ | −4.43633E−2 | −5.86307E−2 |
| $A_4$ | −1.07778E−2 | 3.62928E−2 |
| $A_5$ | 2.91104E−3 | 5.23099E−4 |
| $A_6$ | −7.03438E−3 | −2.13680E−2 |
| $A_7$ | 3.98854E−6 | 5.33612E−5 |
| $A_8$ | 3.41426E−3 | 4.45067E−3 |
| $A_9$ | −1.21763E−6 | 4.45457E−6 |
| $A_{10}$ | −4.21151E−4 | −3.37268E−4 |

FIGS. 18A–18D show the spherical aberration, astigmatism, distortion, and lateral color, respectively, of the imaging lens according to Embodiment 8. In FIG. 18A, the spherical aberration is shown for the e-line (λ=546.07 nm), the g-line (λ=435.8 nm), and the C-line (λ=656.3 nm). As shown in FIG. 18A the f-number of this embodiment is 2.8. In FIG. 18B, the astigmatism is shown at the e-line (λ=546.07 nm) for both the sagittal image surface S and the tangential image surface T. In FIG. 18C the distortion is shown at the e-line (λ=546.07 nm). FIG. 18D shows the lateral color at the g-line (λ=435.8 nm) and at the C-line (λ=656.3 nm). The half-image angle ω for this embodiment is 34.6°.

As is clear from the lens data and aberration curves discussed above, in Embodiment 8 of the imaging lens of the present invention, the various aberrations are well corrected, and performance capabilities that are suitable for a small imaging device can be obtained. In particular, an imaging lens related to Embodiment 8 of the present invention is effective in achieving the following results as compared to other imaging lenses: (1) the distortion aberration can be comparatively smaller; (2) the length from the front end of the optical system to the image plane can be shorter; and (3) the lateral color can be comparatively smaller even if only a single lens material is used.

Embodiment 9

Embodiment 9 is very similar to Embodiment 8 and differs from Embodiment 8 in its lens element configuration only by different radii of curvature of lens surfaces, different eccentricities and aspheric coefficients of the aspheric lens surfaces, and different optical element surface spacings. Therefore, Embodiment 9 is well shown by FIG. 6.

Table 18 below lists the surface number #, in order from the object side, the radius of curvature r (in mm) of each surface near the optical axis, the on-axis surface spacing d (in mm), as well as the refractive index $N_e$ (at the e-line of $\lambda$=546.1 nm) and the Abbe number $v_d$ (at the d-line of $\lambda$=587.6 nm) of each lens element for Embodiment 9. Listed in the bottom portion of Table 18 are the focal length f, the f-number $F_{NO}$, the back focal distance (Bf), the maximum image angle 2ω, and the total on-axis distance from the aperture diaphragm St to the image plane Simg (TCL) for Embodiment 9. The thickness of the glass or plastic cover plate CG is 0.50 mm and its refractive index is 1.51872.

TABLE 18

| # | r | d | $N_e$ | $v_d$ |
|---|---|---|---|---|
| 0 (stop) | ∞ | 0.2000 | | |
| 1 | 1.8735 | 1.2083 | 1.51081 | 56.0 |
| 2 | 3.6085 | 0.4602 | | |
| 3 | 1.7947 | 1.0000 | 1.51081 | 56.0 |
| 4 | 1.9050 | | | |
| f = 4.200 mm | $F_{NO}$ = 2.8 | Bf = 1.907 mm | 2ω = 69° | TCL = 4.775 mm |

Table 19 below lists the values of the constants K, $A_4$, $A_6$, $A_8$, and $A_{10}$ used in Equation (A) above for each of the aspheric lens surfaces (#1 and #2) of lens element L1 of Table 18, and Table 20 below lists the values of the constants K and $A_3$–$A_{10}$ used in Equation (A) above for each of the aspheric lens surfaces (#3 and #4) of lens element L2 of Table 18. Aspheric coefficients that are not present in Tables 19 and 20 are zero. An "E" in the data indicates that the number following the "E" is the exponent to the base 10. For example, "1.0E-2" represents the number $1.0 \times 10^{-2}$.

TABLE 19

| # | K | $A_4$ | $A_6$ | $A_8$ | $A_{10}$ |
|---|---|---|---|---|---|
| 1 | −1.06047 | 7.15253E−2 | −9.28424E−3 | 3.73723E−3 | −2.22709E−4 |
| 2 | −2.67306E−1 | −9.56477E−2 | 7.80424E−2 | 1.45746E−2 | −5.55543E−3 |

TABLE 20

| Aspheric Factor | #3 | #4 |
|---|---|---|
| K | 7.51249E−2 | 9.13974E−1 |
| $A_3$ | −1.19134E−1 | −1.76537E−1 |
| $A_4$ | −6.46100E−2 | 4.21846E−2 |

TABLE 20-continued

| Aspheric Factor | #3 | #4 |
|---|---|---|
| $A_5$ | −9.53700E−3 | −4.74730E−4 |
| $A_6$ | −8.58963E−3 | −2.16580E−2 |
| $A_7$ | −1.54465E−4 | 1.25086E−5 |
| $A_8$ | 3.39927E−3 | 4.44663E−3 |
| $A_9$ | −2.62721E−6 | 4.24984E−6 |
| $A_{10}$ | −4.21151E−4 | −3.37243E−4 |

FIGS. 19A–19D show the spherical aberration, astigmatism, distortion, and lateral color, respectively, of the imaging lens according to Embodiment 9. In FIG. 19A, the spherical aberration is shown for the e-line ($\lambda$=546.07 nm), the g-line ($\lambda$=435.8 nm), and the C-line ($\lambda$=656.3 nm). As shown in FIG. 19A the f-number of this embodiment is 2.8. In FIG. 19B, the astigmatism is shown at the e-line ($\lambda$=546.07 nm) for both the sagittal image surface S and the tangential image surface T. In FIG. 19C the distortion is shown at the e-line ($\lambda$=546.07 nm). FIG. 19D shows the lateral color at the g-line ($\lambda$=435.8 nm) and at the C-line ($\lambda$=656.3 nm). The half-image angle co for this embodiment is 34.6°.

As is clear from the lens data and aberration curves discussed above, in Embodiment 9 of the imaging lens of the present invention, the various aberrations are well corrected, and performance capabilities that are suitable for a small imaging device can be obtained. In particular, an imaging lens related to Embodiment 9 of the present invention is effective in achieving the following results as compared to other imaging lenses: (1) the distortion aberration can be comparatively smaller; (2) the length from the front end of the optical system to the image plane can be shorter; and (3) the lateral color can be comparatively smaller even if only a single lens material is used.

Embodiment 10

Figure 7:
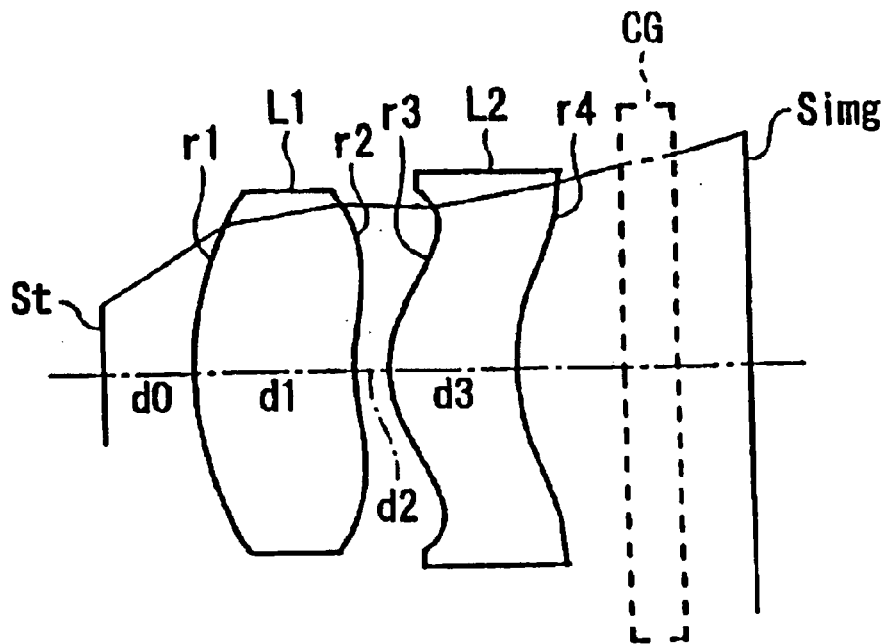
FIG. 7 shows a cross-sectional view of the imaging lens according to Embodiment 10.

FIG. 7 shows the basic lens element configuration of an imaging lens of Embodiment 10 of the present invention. As shown in FIG. 7, the lens surface configuration near the optical axis of the object-side lens surface of the first lens element L1 is convex, the lens surface configuration near the optical axis of the image-side lens surface of the first lens element L1 is concave, and the lens surface configuration near the periphery of the image-side lens surface of the first lens element L1 is convex. Additionally, as shown in FIG. 7, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is concave, and the lens surface configuration near the periphery of the image-side lens surface of the second lens element L2 is convex.

Table 21 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 10. Listed in the bottom portion of Table 21 are the focal length f, the f-number $F_{NO}$, the back focal distance (Bf), the maximum image angle 2ω, and the total on-axis distance from the aperture diaphragm St to the image plane Simg (TCL) for Embodiment 10. The thickness of the glass or plastic cover plate CG is 0.50 mm and its refractive index is 1.51872.

TABLE 21

| # | r | d | $N_e$ | $v_d$ |
|---|---|---|---|---|
| 0 (stop) | ∞ | 0.84928 | | |
| 1 | 3.1051 | 1.50001 | 1.510812 | 56.0 |
| 2 | 2.1496 | 0.32098 | | |
| 3 | 1.0771 | 1.20000 | 1.510812 | 56.0 |
| 4 | 3.1037 | | | |
| f = 3.620 mm | $F_{NO}$ = 2.8 | Bf = 2.011 mm | 2ω = 62° | TCL = 5.881 mm |

Table 22 below lists the values of the constants K, $A_4$, $A_6$, $A_8$, and $A_{10}$ used in Equation (A) above for each of the aspheric lens surfaces of Table 21. Aspheric coefficients that are not present in Table 22 are zero. An "E" in the data indicates that the number following the "E" is the exponent to the base 10. For example, "1.0E-2" represents the number $1.0 \times 10^{-2}$.

TABLE 22

| # | K | $A_4$ | $A_6$ | $A_8$ | $A_{10}$ |
|---|---|---|---|---|---|
| 1 | −6.29986 | 1.53798E−2 | 1.21692E−2 | −1.11344E−2 | 2.54928E−3 |
| 2 | −1.51482 | −2.08165E−1 | 8.89807E−2 | −2.55657E−2 | 3.11514E−3 |
| 3 | −1.18770 | −3.37577E−3 | −1.34069E−2 | −6.91941E−3 | 1.09013E−3 |
| 4 | 2.66840 | 1.27685E−1 | −1.17643E−1 | 3.18908E−2 | −3.45215E−3 |

FIGS. 20A–20D show the spherical aberration, astigmatism, distortion, and lateral color, respectively, of the imaging lens according to Embodiment 10. In FIG. 20A, the spherical aberration is shown for the e-line (λ=546.07 nm), the g-line (λ=435.8 nm), and the C-line (λ=656.3 nm). As shown in FIG. 20A the f-number of this embodiment is 2.8. In FIG. 20B, the astigmatism is shown at the e-line (λ=546.07 nm) for both the sagittal image surface S and the tangential image surface T. In FIG. 20C the distortion is shown at the e-line (λ=546.07 nm). FIG. 20D shows the lateral color at the g-line (λ=435.8 nm) and at the C-line (λ=656.3 nm). The half-image angle ω for this embodiment is 30.8°.

As is clear from the lens data and aberration curves discussed above, in Embodiment 10 of the imaging lens of the present invention, the various aberrations are well corrected, and performance capabilities that are suitable for a small imaging device can be obtained. In particular, an imaging lens related to Embodiment 10 of the present invention is effective in achieving the following results as compared to other imaging lenses: (1) the distortion at the image plane can be comparatively smaller; and (2) while the length from the front end of the optical system to the image plane can be comparatively shorter, a sufficient quantity of light can be obtained by the image pickup device even at the periphery of the image plane.

Embodiment 11

Figure 8:
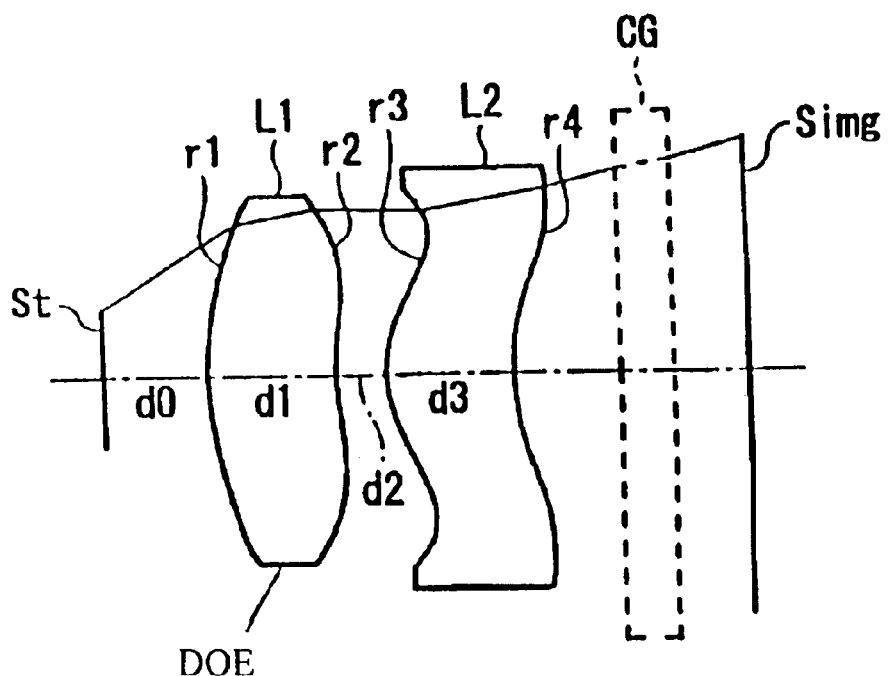
FIG. 8 shows a cross-sectional view of the imaging lens according to Embodiment 11.

FIG. 8 shows the basic lens element configuration of an imaging lens of Embodiment 11 of the present invention. Embodiment 11 is very similar to Embodiment 10 and differs from Embodiment 10 in its lens elements configuration only by different radii of curvature of lens surfaces, different eccentricities and aspheric coefficients of the aspheric lens surfaces, some different optical surface spacings, and the object-side lens surface of lens element L1 being a diffractive optical surface.

As discussed above with regard to Embodiment 4, by making at least one of the lens surfaces of the first lens element L1 and the second lens element L2 to be a diffractive optical surface, excellent correction of lateral color can be made, color blur decreased, and image quality, such as image resolution, can be improved. The diffractive optical surface is formed so that the diffractive optical surface adds an optical path length O that varies with the distance from the optical axis according Equation (B) discussed above with regard to Embodiment 4. In Embodiment 11, the DOE constant of the object-side lens surface of lens element L1 is −114.465.

Table 23 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number $v_d$ (at the d-line of λ=587.6 nm) of each lens element for Embodiment 11. Listed in the bottom portion of Table 23 are the focal length f, the f-number $F_{NO}$, the back focal distance (Bf), the maximum image angle 2ω, and the total on-axis distance from the aperture diaphragm St to the image plane Simg (TCL) for Embodiment 11. The thickness of the glass or plastic cover plate CG is 0.50 mm and its refractive index is 1.51872.

TABLE 23

| # | r | d | $N_e$ | $v_d$ |
|---|---|---|---|---|
| 0 (stop) | ∞ | 0.98192 | | |
| 1 | 3.1182 | 1.20000 | 1.510812 | 56.0 |
| 2 | 2.4293 | 0.46898 | | |
| 3 | 1.2044 | 1.20000 | 1.510812 | 56.0 |
| 4 | 3.2136 | | | |
| f = 3.620 mm | $F_{NO}$ = 2.8 | Bf = 2.034 mm | 2ω = 62° | TCL = 5.885 mm |

Table 24 below lists the values of the constants K, $A_4$, $A_6$, $A_8$, and $A_{10}$ used in Equation (A) above for each of the aspheric lens surfaces of Table 23. Aspheric coefficients that are not present in Table 24 are zero. An "E" in the data indicates that the number following the "E" is the exponent to the base 10. For example, "1.0E-2" represents the number $1.0 \times 10^{-2}$.

TABLE 24

| # | K | $A_4$ | $A_6$ | $A_8$ | $A_{10}$ |
|---|---|---|---|---|---|
| 1 | −6.19449 | −8.44727E−3 | 2.27410E−2 | −1.27301E−2 | 2.32699E−3 |
| 2 | −9.58202E−1 | −1.93610E−1 | 7.49286E−2 | −2.07462E−2 | 2.56030E−3 |
| 3 | −1.19366 | 2.34717E−3 | −1.52130E−2 | −1.10925E−2 | 2.83169E−3 |
| 4 | 1.01569 | 1.25562E−1 | −1.12639E−1 | 2.97641E−2 | −2.74154E−3 |

FIGS. 21A–21D show the spherical aberration, astigmatism, distortion, and lateral color, respectively, of the imaging lens according to Embodiment 11. In FIG. 21A, the spherical aberration is shown for the e-line (λ=546.07 nm), the g-line (λ=435.8 nm), and the C-line (λ=656.3 nm). As shown in FIG. 21A the f-number of this embodiment is 2.8. In FIG. 21B, the astigmatism is shown at the e-line (λ=546.07 nm) for both the sagittal image surface S and the tangential image surface T. In FIG. 21C the distortion is shown at the e-line (λ=546.07 nm). FIG. 21D shows the lateral color at the g-line (λ=435.8 nm) and at the C-line (λ=656.3 nm). The half-image angle co for this embodiment is 30.8°.

As is clear from the lens data and aberration curves discussed above, in Embodiment 11 of the imaging lens of the present invention, the various aberrations are well corrected, and performance capabilities that are suitable for a small imaging device can be obtained. In particular, an imaging lens related to Embodiment 11 of the present invention is effective in achieving the following results as compared to other imaging lenses: (1) the distortion at the image plane can be comparatively smaller; and (2) while the length from the front end of the optical system to the image plane can be comparatively shorter, a sufficient quantity of light can be obtained by the image pickup device even at the periphery of the image plane.

Embodiment 12

Figure 9:
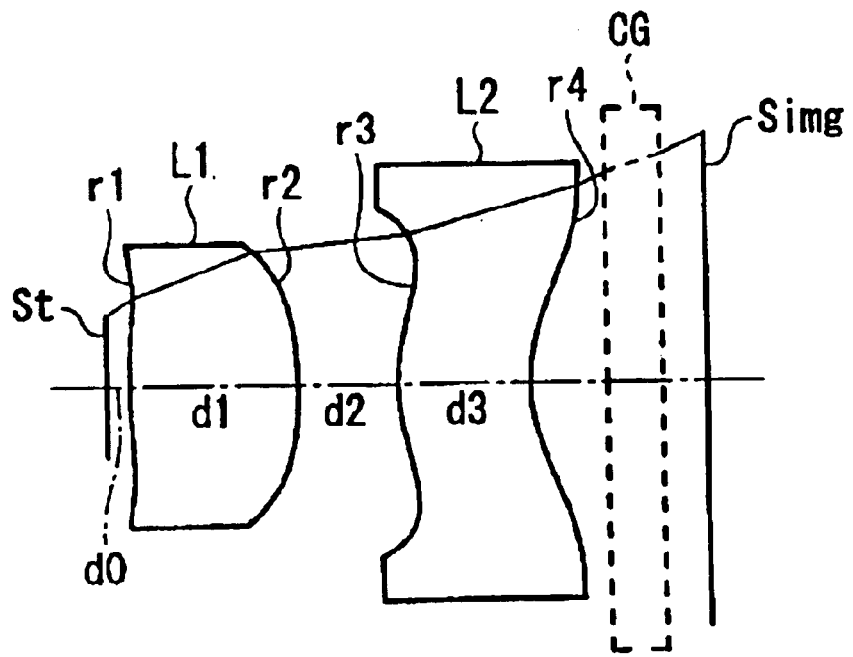
FIG. 9 shows a cross-sectional view of the imaging lens according to Embodiments 12 and 13.

FIG. 9 shows the basic lens element configuration of an imaging lens of Embodiment 12 of the present invention. As shown in FIG. 9, the lens surface configuration near the optical axis of the object-side lens surface of the first lens element L1 is convex, and the lens surface configuration near the optical axis of the image-side lens surface of the first lens element L1 is convex. Additionally, as shown in FIG. 9, the lens surface configuration near the optical axis of the object-side lens surface of the second lens element L2 is convex, the lens surface configuration near the periphery of the object-side lens surface of the second lens element L2 is concave, the lens surface configuration near the optical axis of the image-side lens surface of the second lens element L2 is concave, and a lens surface configuration near the periphery of the image-side lens surface of the second lens element L2 is convex.

Additionally, in Embodiment 12, as well as Embodiment 13 discussed below, preferably the following condition is satisfied:

$v_1/v_2 > 1.5$         Condition (1)

where $v_1$ is the Abbe number of the lens material of the first lens element L1 at the d-line of 587.6 nm, and $v_2$ is the Abbe number of the lens material of the second lens element L2 at the d-line of 587.6 nm.

Satisfying Condition (1) assists in correcting lateral color.

Table 25 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number Pd (at the d-line of λ=587.6 nm) of each lens element for Embodiment 12. Listed in the bottom portion of Table 25 are the focal length f, the f-number $F_{NO}$, the back focal distance (Bf), the maximum image angle 2ω, and the total on-axis distance from the aperture diaphragm St to the image plane Simg (TCL) for Embodiment 12. The thickness of the glass or plastic cover plate CG is 0.50 mm and its refractive index is 1.51872.

TABLE 25

| # | r | d | $N_e$ | $v_d$ |
|---|---|---|---|---|
| 0 (stop) | ∞ | 0.20639 | | |
| 1 | 5.5044 | 1.51876 | 1.510812 | 56.0 |
| 2 | −4.4454 | 0.91525 | | |
| 3 | 1.8389 | 1.20089 | 1.588198 | 30.3 |
| 4 | 1.5846 | | | |
| f = 3.572 mm | $F_{NO}$ = 2.8 | Bf = 1.435 mm | 2ω = 62° | TCL = 5.276 mm |

As is clear from Table 25, Embodiment 12 satisfies Condition (1) above.

Table 26 below lists the values of the constants K, $A_4$, $A_6$, $A_8$, and $A_{10}$ used in Equation (A) above for each of the aspheric lens surfaces (#1 and #2) of lens element L1 of Table 25, and Table 27 below lists the values of the constants K and $A_3$–$A_8$ used in Equation (A) above for each of the aspheric lens surfaces (#3 and #4) of lens element L2 of Table 25. Aspheric coefficients that are not present in Tables 26 and 27 are zero. An "E" in the data indicates that the number following the "E" is the exponent to the base 10. For example, "1.0E−2" represents the number $1.0 \times 10^{-2}$.

TABLE 26

| # | K | $A_4$ | $A_6$ | $A_8$ | $A_{10}$ |
|---|---|---|---|---|---|
| 1 | −6.34586 | −1.32350E−2 | −4.85461E−2 | −1.43777E−2 | 1.723241E−2 |
| 2 | −1.37158 | −1.21929E−1 | 4.13986E−2 | −1.92022E−2 | 7.99612E−4 |

TABLE 27

| Aspheric Factor | #3 | #4 |
|---|---|---|
| K | 8.81571E−1 | 5.60947E−1 |
| $A_3$ | −4.15232E−2 | 1.14966E−2 |

TABLE 27-continued

| Aspheric Factor | #3 | #4 |
|---|---|---|
| $A_4$ | 2.27878E−3 | −4.55428E−2 |
| $A_5$ | −1.16759E−1 | −6.39583E−2 |
| $A_6$ | 4.86423E−3 | 6.87192E−3 |
| $A_7$ | 5.03724E−2 | 2.52552E−2 |
| $A_8$ | −2.56065E−2 | −9.54638E−3 |

FIGS. 22A–22D show the spherical aberration, astigmatism, distortion, and lateral color, respectively, of the imaging lens according to Embodiment 12. In FIG. 22A, the spherical aberration is shown for the e-line (λ=546.07 nm), the g-line (λ=435.8 nm), and the C-line (λ=656.3 nm). As shown in FIG. 22A, the f-number of this embodiment is 2.8. In FIG. 22B, the astigmatism is shown at the e-line (λ=546.07 nm) for both the sagittal image surface S and the tangential image surface T. In FIG. 22C the distortion is shown at the e-line (λ=546.07 nm). FIG. 22D shows the lateral color at the g-line (λ=435.8 nm) and at the C-line (λ=656.3 nm). The half-image angle ω for this embodiment is 30.8°.

As is clear from the lens data and aberration curves discussed above, in Embodiment 12 of the imaging lens of the present invention, the various aberrations are well corrected, and performance capabilities that are suitable for a small imaging device can be obtained. In particular, an imaging lens related to Embodiment 12 of the present invention is effective in achieving the following results as compared to other imaging lenses: (1) the distortion aberration can be comparatively smaller; (2) the length from the front end of the optical system to the image plane can be shorter; (3) the field curvature may be comparatively smaller; and (4) coma aberration may be sufficiently smaller to provide an excellent image.

Embodiment 13

Embodiment 13 is very similar to Embodiment 12 and differs from Embodiment 12 in its lens element configuration only by different radii of curvature of lens surfaces, different eccentricities and aspheric coefficients of the aspheric lens surfaces, and different optical element surface spacings. Therefore, Embodiment 13 is well shown by FIG. 9.

Table 28 below lists the surface number #, in order from the object side, the radius of curvature r (in mm) of each surface near the optical axis, the on-axis surface spacing d (in mm), as well as the refractive index $N_e$ (at the e-line of λ=546.1 nm) and the Abbe number Pd (at the d-line of λ=587.6 nm) of each lens element for Embodiment 13. Listed in the bottom portion of Table 28 are the focal length f, the f-number $F_{NO}$, the back focal distance (Bf), the maximum image angle 2ω, and the total on-axis distance from the aperture diaphragm St to the image plane Simg (TCL) for Embodiment 13. The thickness of the glass or plastic cover plate CG is 0.50 mm and its refractive index is 1.51872.

TABLE 28

| # | r | d | $N_e$ | $v_d$ |
|---|---|---|---|---|
| 0 (stop) | ∞ | 0.20023 | | |
| 1 | 5.114 | 1.62454 | 1.510812 | 56.0 |
| 2 | −4.7336 | 0.83316 | | |
| 3 | 1.8954 | 1.20201 | 1.588198 | 30.3 |
| 4 | 1.6914 | | | | f = 3.570 mm  $F_{NO}$ = 2.8  Bf = 1.462 mm  2ω = 62°  TCL = 5.322 mm

As is clear from Table 28, Embodiment 13 satisfies Condition (1) above.

Table 29 below lists the values of the constants K, $A_4$, $A_6$, $A_8$, and $A_{10}$ used in Equation (A) above for each of the aspheric lens surfaces (#1 and #2) of lens element L1 of Table 28, and Table 30 below lists the values of the constants K and $A_3$–$A_8$, used in Equation (A) above for each of the aspheric lens surfaces (#3 and #4) of lens element L2 of Table 28. Aspheric coefficients that are not present in Tables 29 and 30 are zero. An "E" in the data indicates that the number following the "E" is the exponent to the base 10. For example, "1.0E-2" represents the number $1.0 \times 10^{-2}$.

TABLE 29

| # | K | $A_4$ | $A_6$ | $A_8$ | $A_{10}$ |
|---|---|---|---|---|---|
| 1 | −6.33819 | −6.19819E−3 | −4.69325E−2 | −1.32574E−2 | 1.68264E−2 |
| 2 | −1.33683 | −1.25998E−1 | 4.53613E−2 | −1.91640E−2 | 1.03630E−3 |

TABLE 30

| Aspheric Factor | #3 | #4 |
|---|---|---|
| K | 9.94497E−1 | 6.40420E−1 |
| $A_3$ | −4.41360E−2 | −5.78488E−4 |
| $A_4$ | −6.34326E−3 | −3.55185E−2 |
| $A_5$ | −1.11340E−1 | −5.40817E−2 |
| $A_6$ | 7.67245E−3 | 2.45232E−3 |
| $A_7$ | 4.74497E−2 | 2.14214E−2 |
| $A_8$ | −2.58460E−2 | −7.75838E−3 |

FIGS. 23A–23D show the spherical aberration, astigmatism, distortion, and lateral color, respectively, of the imaging lens according to Embodiment 13. In FIG. 23A, the spherical aberration is shown for the e-line (λ=546.07 nm), the g-line (λ=435.8 nm), and the C-line (λ=656.3 nm). As shown in FIG. 23A the f-number of this embodiment is 2.8. In FIG. 23B, the astigmatism is shown at the e-line (λ=546.07 nm) for both the sagittal image surface S and the tangential image surface T. In FIG. 23C the distortion is shown at the e-line (λ=546.07 nm). FIG. 23D shows the lateral color at the g-line (λ=435.8 nm) and at the C-line (λ=656.3 nm). The half-image angle co for this embodiment is 30.8°.

As is clear from the lens data and aberration curves discussed above, in Embodiment 13 of the imaging lens of the present invention, the various aberrations are well corrected, and performance capabilities that are suitable for a small imaging device can be obtained. In particular, an imaging lens related to Embodiment 13 of the present invention is effective in achieving the following results as compared to other imaging lenses: (1) the distortion aberration can be comparatively smaller; (2) the length from the front end of the optical system to the image plane can be shorter; (3) the field curvature may be comparatively smaller; and (4) coma aberration may be sufficiently smaller to provide an excellent image.

The invention being thus described, it will be obvious that the same may be varied in many ways. For instance, values such as the radius of curvature r of each of the lens elements, the surface spacing d, the refractive index $N_e$, as well as the Abbe number $v_d$, are not limited to the examples indicated in each of the aforementioned embodiments, as other values can be adopted. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging lens for an image pickup device formed of only two lens components, in order from the object side, a first lens component and a second lens component, wherein:
    an aperture diaphragm is on the object side of the first lens component;
    the object-side lens surface of the first lens component is aspheric;
    the image-side lens surface of the first lens component is aspheric;
    the object-side lens surface of the second lens component is aspheric and the lens surface configuration near the optical axis of the object-side lens surface of the second lens component is convex;
    the image-side lens surface of the second lens component is aspheric; and
    the lens surface configuration near the optical axis of at least one of the object-side lens surface of the first lens component, the image-side lens surface of the first lens component, and the image-side lens surface of the second lens component is concave.

2. The imaging lens of claim 1, wherein:
    the lens surface configuration near the optical axis of the object-side lens surface of the first lens component is concave;
    the lens surface configuration near the optical axis of the image-side lens surface of the first lens component is convex; and
    the lens surface configuration near the optical axis of the image-side lens surface of the second lens component is concave.

3. The imaging lens of claim 2, wherein the first lens component includes only one lens element and the second lens component includes only one lens element.

4. The imaging lens of claim 1, wherein:
    the lens surface configuration near the optical axis of the object-side lens surface of the first lens component is concave;
    the lens surface configuration near the optical axis of the image-side lens surface of the first lens component is concave;
    the lens surface configuration near the periphery of the image-side lens surface of the first lens component is convex;
    the lens surface configuration near the periphery of the object-side lens surface of the second lens component is concave;
    the lens surface configuration near the optical axis of the image-side lens surface of the second lens component is concave; and
    the lens surface configuration near the periphery of the image-side lens surface of the second lens component is convex.

5. The imaging lens of claim 4, wherein the first lens component includes only one lens element and the second lens component includes only one lens element.

6. The imaging lens of claim 1, wherein:
    the lens surface configuration near the optical axis of the object-side lens surface of the first lens component is concave;
    the lens surface configuration near the optical axis of the image-side lens surface of the first lens component is concave;
    the lens surface configuration near the periphery of the image-side lens surface of the first lens component is convex;
    the lens surface configuration near the periphery of the object-side lens surface of the second lens component is concave;
    the lens surface configuration near the optical axis of the image-side lens surface of the second lens component is convex;
    the lens surface configuration of the intermediate portion of the image-side lens surface of the second lens component is concave; and
    the lens surface configuration near the periphery of the image-side lens surface of the second lens component is convex.

7. The imaging lens of claim 6, wherein the first lens component includes only one lens element and the second lens component includes only one lens element.

8. The imaging lens of claim 6, wherein at least one of the lens surfaces includes a diffractive optical surface.

9. The imaging lens of claim 1, wherein:
    the lens surface configuration near the optical axis of the object-side lens surface of the first lens component is convex;
    the lens surface configuration near the optical axis of the image-side lens surface of the first lens component is concave;
    the lens surface configuration near the periphery of the image-side lens surface of the first lens component is convex;
    the lens surface configuration near the periphery of the object-side lens surface of the second lens component is concave;
    the lens surface configuration near the optical axis of the image-side lens surface of the second lens component is convex;
    the lens surface configuration of the intermediate portion of the image-side lens surface of the second lens component is concave; and
    the lens surface configuration near the periphery of the image-side lens surface of the second lens component is convex.

10. The imaging lens of claim 9, wherein the first lens component includes only one lens element and the second lens component includes only one lens element.

11. The imaging lens of claim 1, wherein:
the lens surface configuration near the optical axis of the object-side lens surface of the first lens component is convex;
the lens surface configuration near the optical axis of the image-side lens surface of the first lens component is concave;
the lens surface configuration near the periphery of the object-side lens surface of the second lens component is concave;
the lens surface configuration near the optical axis of the image-side lens surface of the second lens component is concave; and
a lens surface configuration near the periphery of the image-side lens surface of the second lens component is convex.

12. The imaging lens of claim 11, wherein the first lens component includes only one lens element and the second lens component includes only one lens element.

13. The imaging lens of claim 11, wherein at least one of the lens surfaces includes a diffractive optical surface.

14. The imaging lens of claim 1 wherein:
the lens surface configuration near the optical axis of the object-side lens surface of the first lens component is convex;
the lens surface configuration near the optical axis of the image-side lens surface of the first lens component is concave;
the lens surface configuration near the periphery of the image-side lens surface of the first lens component is convex;
the lens surface configuration near the periphery of the object-side lens surface of the second lens component is concave;
the lens surface configuration near the optical axis of the image-side lens surface of the second lens component is concave; and
the lens surface configuration near the periphery of the image-side lens surface of the second lens component is convex.

15. The imaging lens of claim 14, wherein the first lens component includes only one lens element and the second lens component includes only one lens element.

16. The imaging lens of claim 14, wherein at least one of the lens surfaces includes a diffractive optical surface.

17. The imaging lens of claim 1, wherein:
the lens surface configuration near the optical axis of the object-side lens surface of the first lens component is convex;
the lens surface configuration near the optical axis of the image-side lens surface of the first lens component is convex;
the lens surface configuration near the periphery of the object-side lens surface of the second lens component is concave;
the lens surface configuration near the optical axis of the image-side lens surface of the second lens component is concave and
the lens surface configuration near the periphery of the image-side lens surface of the second lens component is convex.

18. The imaging lens of claim 17, wherein the first lens component includes only one lens element and the second lens component includes only one lens element.

19. The imaging lens of claim 1, wherein the first lens component includes only one lens element and the second lens component includes only one lens element and the following condition is satisfied:

$$\nu_1/\nu_2 > 1.5$$

where
$\nu_1$ is the Abbe number of the lens material of the first lens element at the d-line of 587.6 nm, and
$\nu_2$ is the Abbe number of the lens material of the second lens element at the d-line of 587.6 nm.

20. The imaging lens of claim 1, wherein:
the lens surface configuration near the optical axis of the object-side lens surface of the first lens component is convex;
the lens surface configuration near the optical axis of the image-side lens surface of the first lens component is concave;
the lens surface configuration near the periphery of the object-side lens surface of the second lens component is concave;
the lens surface configuration near the optical axis of the image-side lens surface of the second lens component is concave; and
the lens surface configuration near the periphery of the image-side lens surface of the second lens component is convex.

21. The imaging lens of claim 20, wherein at least one of the lens surfaces includes a diffractive optical surface.

22. The imaging lens of claim 1, wherein:
the lens surface configuration near the optical axis of the object-side lens surface of the first lens component is convex;
the lens surface configuration near the optical axis of the image-side lens surface of the first lens component is concave;
the lens surface configuration near the periphery of the object-side lens surface of the second lens component is concave;
the lens surface configuration near the optical axis of the image-side lens surface of the second lens component is concave;
the lens surface configuration of the intermediate portion of the image-side lens surface of the second lens component is convex; and
a lens surface configuration near the periphery of the image-side lens surface of the second lens component is concave.

23. The imaging lens of claim 1, wherein the first lens component includes only one lens element and the second lens component includes only one lens element.

* * * * *

UNITED STATES PATENT AND TRADEMARK OFFICE
CERTIFICATE OF CORRECTION

PATENT NO. : 6,842,295 B2
DATED : January 11, 2005
INVENTOR(S) : Yamakawa

It is certified that error appears in the above-identified patent and that said Letters Patent is hereby corrected as shown below:

Column 2,
Line 62, delete "and";
Line 66, change "imagine" to -- imaging --;

Column 4,
Line 34, change "zoom" to -- imaging --;
Line 36, change "1 - 9. In FIGS. 1 - 9," to -- 1 - 9 and 24. In FIGS. 1 - 9 and 24, --;

Column 6,
Line 4, change "FIG. 1," to -- FIG. 2, --;

Column 8,
Line 62, change "angle co" to -- angle $\omega$ --;

Column 12,
Line 1, change "c-line" to -- e-line --;

Column 18,
Line 22, change "angle co" to -- angle $\omega$ --;

Column 20,
Line 16, change "according" to -- acording to --;

Column 21,
Line 21, change "angle co"to -- angle $\omega$ --;

Column 22,
Line 19, change "Pd" to -- $\upsilon_d$ --;
Line 57, change the value of "$A_{10}$" for surface "1" to -- 1.72324E-2 --;

Column 23,
Line 59, change "Pd" to -- $\upsilon_d$ --;

UNITED STATES PATENT AND TRADEMARK OFFICE
CERTIFICATE OF CORRECTION

PATENT NO. : 6,842,295 B2
DATED : January 11, 2005
INVENTOR(S) : Yamakawa

It is certified that error appears in the above-identified patent and that said Letters Patent is hereby corrected as shown below:

Column 24,
Line 60, change "angle co" to -- angle $\omega$ --;

Signed and Sealed this

Twenty-third Day of August, 2005

JON W. DUDAS
*Director of the United States Patent and Trademark Office*